Figure 5:
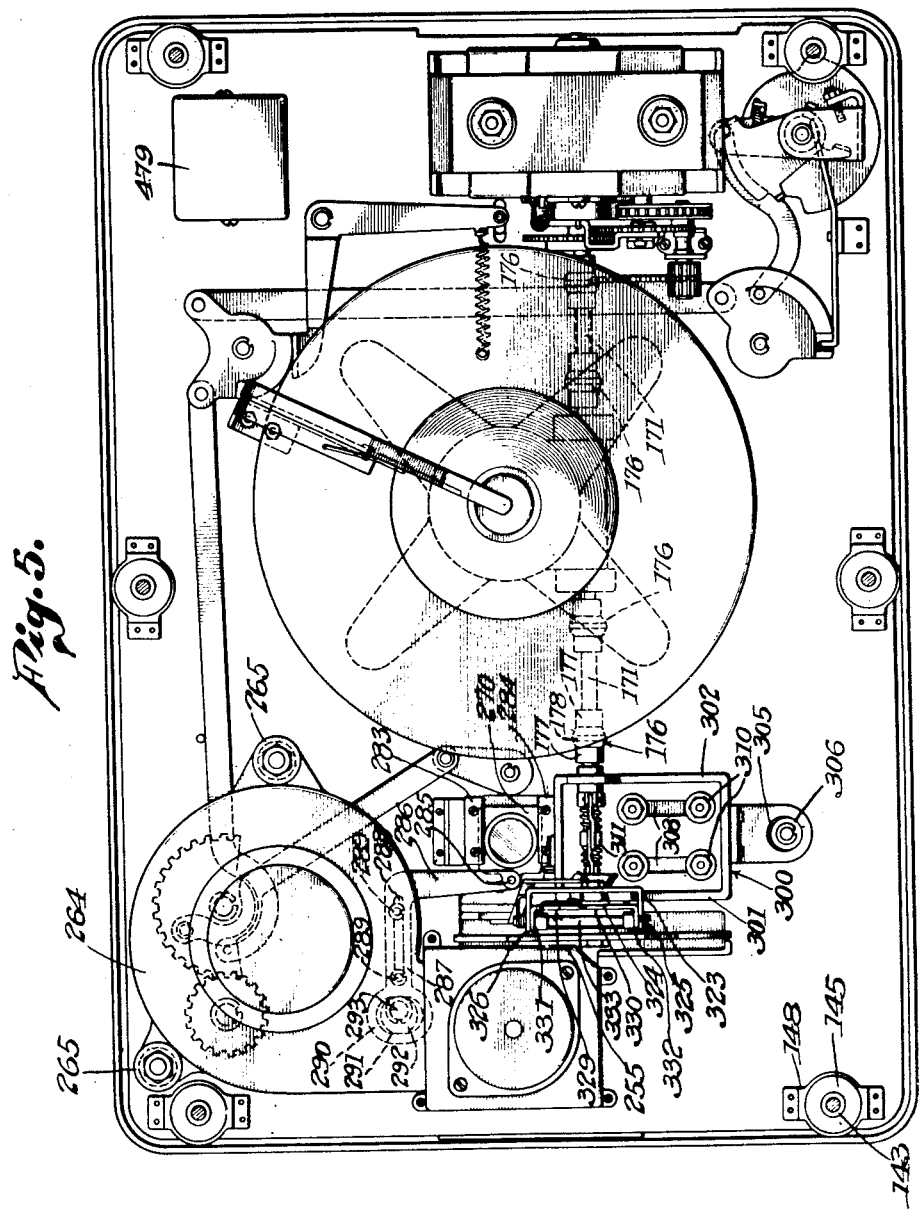

June 27, 1950 — R. M. LIKE — 2,512,724
COMBINATION SOUND AND PICTURE MECHANISM
Filed Nov. 1, 1948 — 14 Sheets-Sheet 1
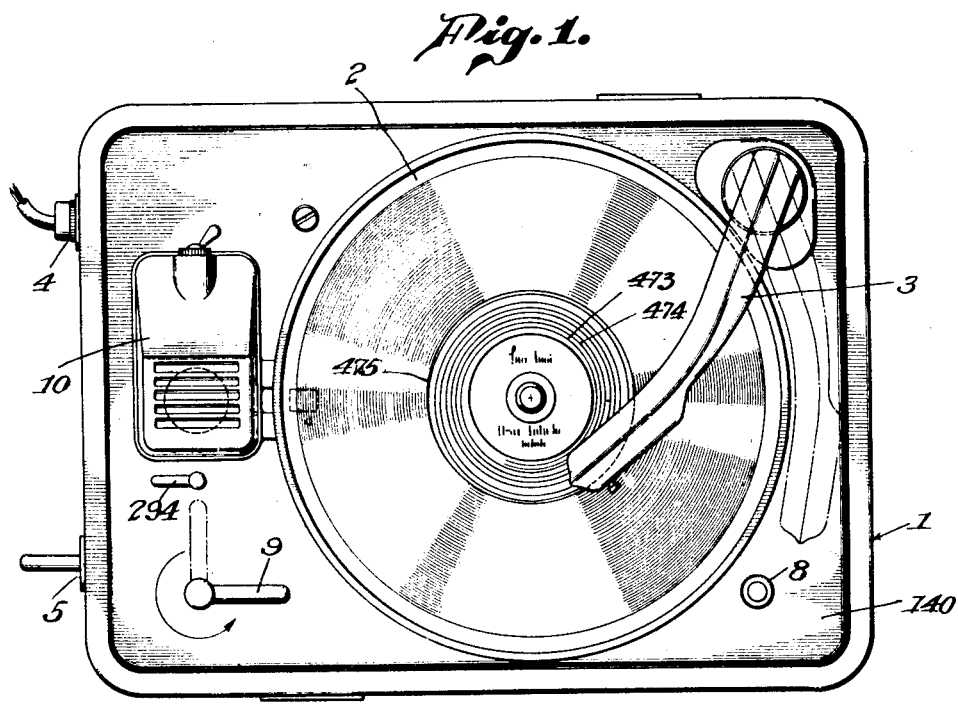
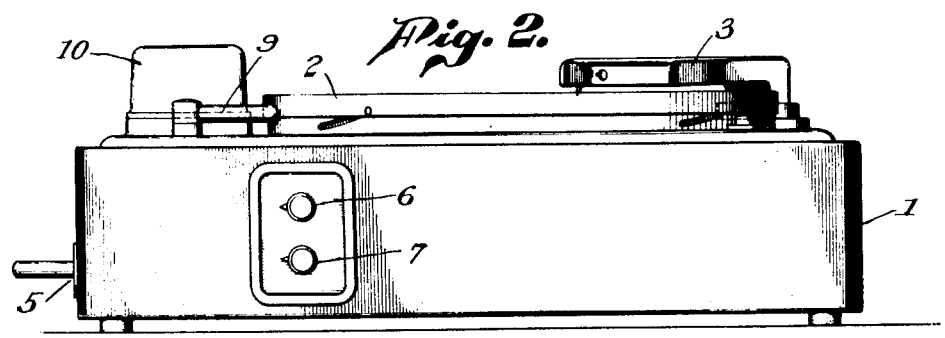
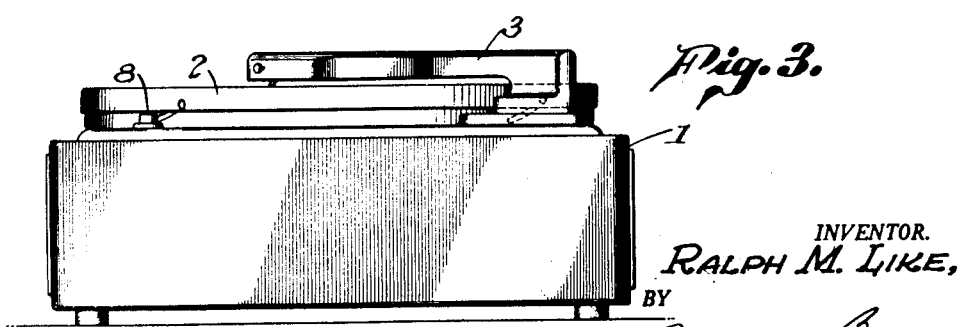
INVENTOR.
RALPH M. LIKE,
BY
ATTORNEY.

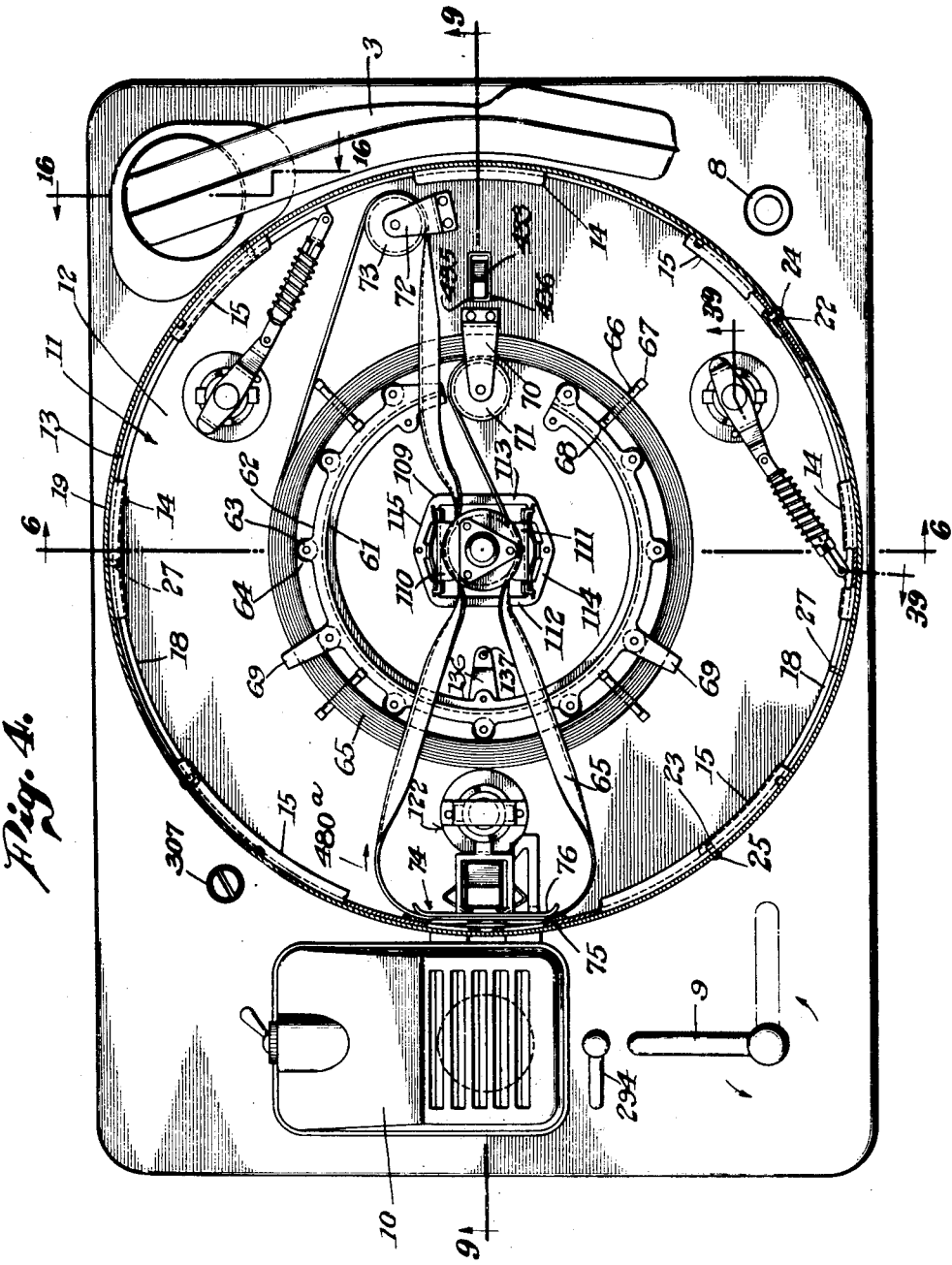

June 27, 1950  R. M. LIKE  2,512,724
COMBINATION SOUND AND PICTURE MECHANISM
Filed Nov. 1, 1948  14 Sheets-Sheet 3

INVENTOR.
RALPH M. LIKE,
BY
Calvin Brown,
ATTORNEY.

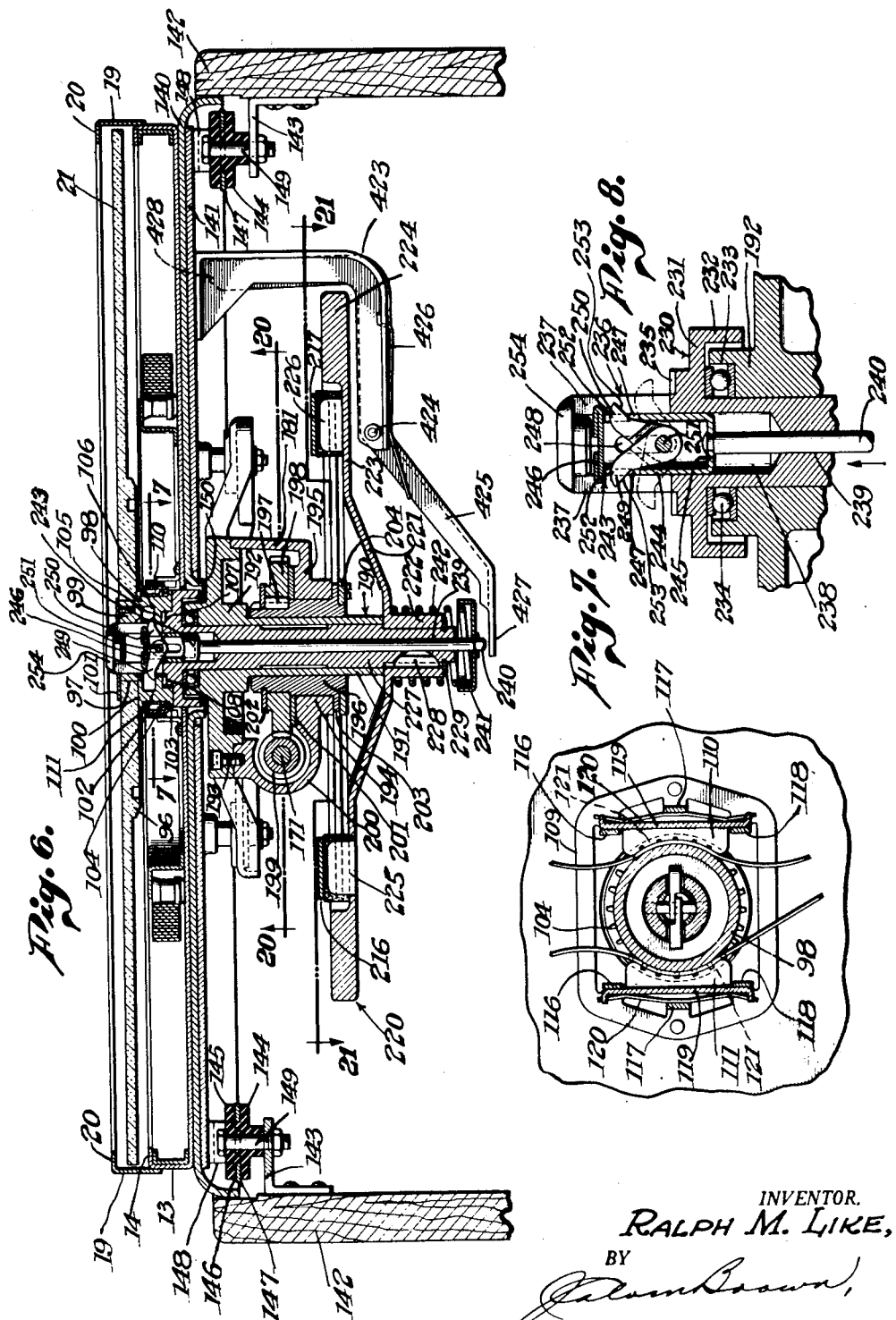

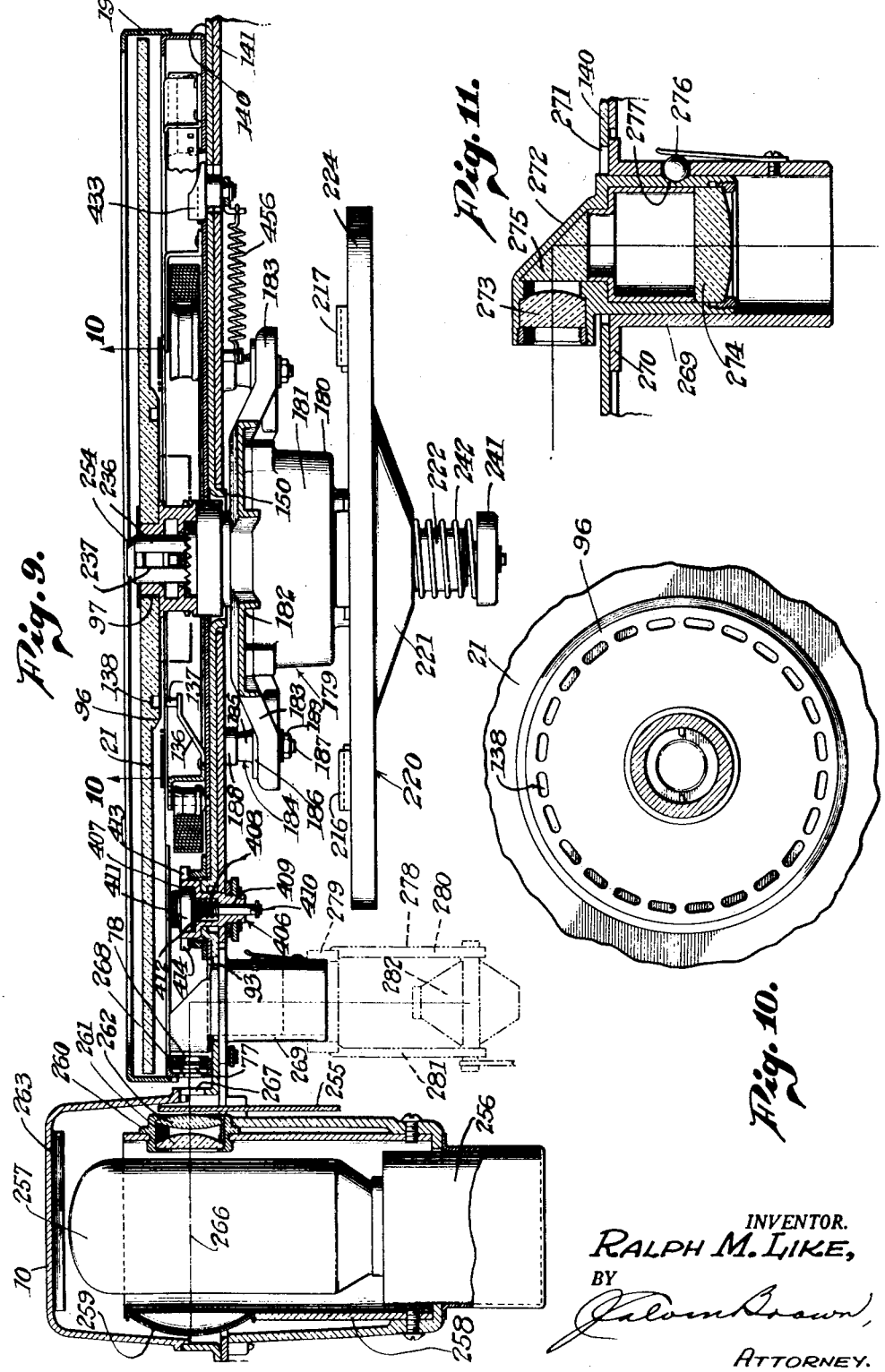

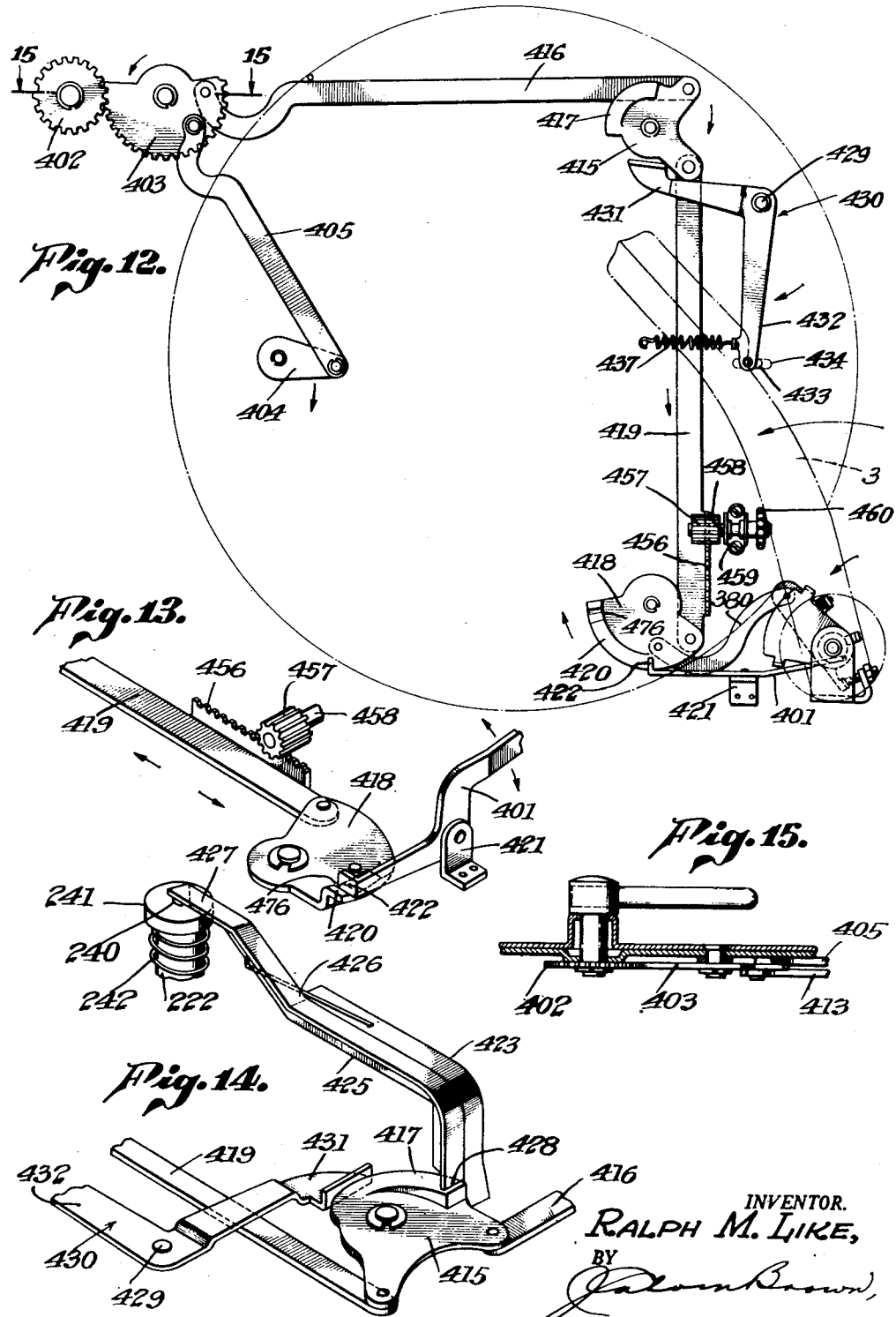

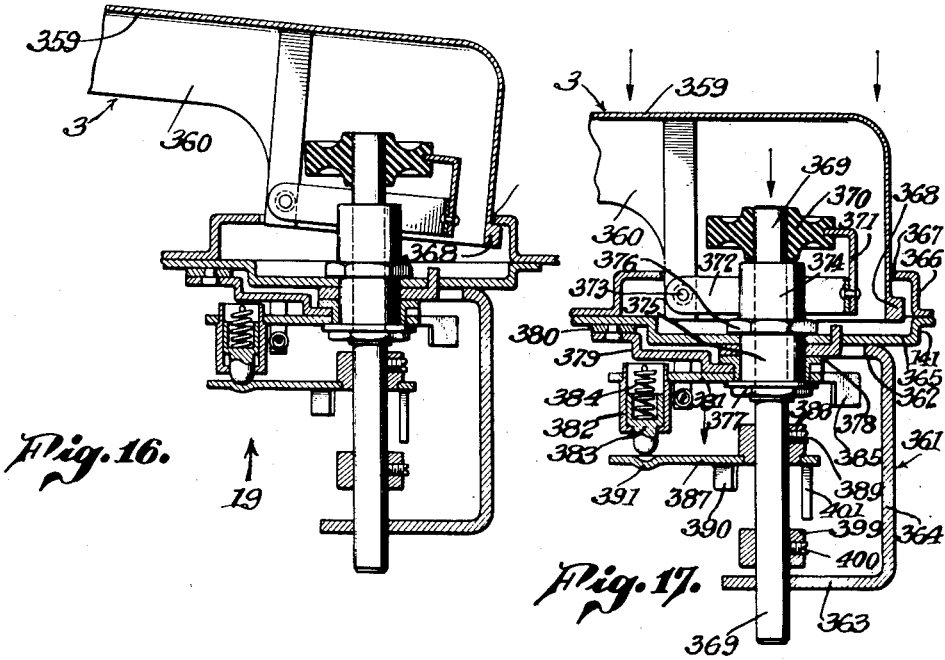

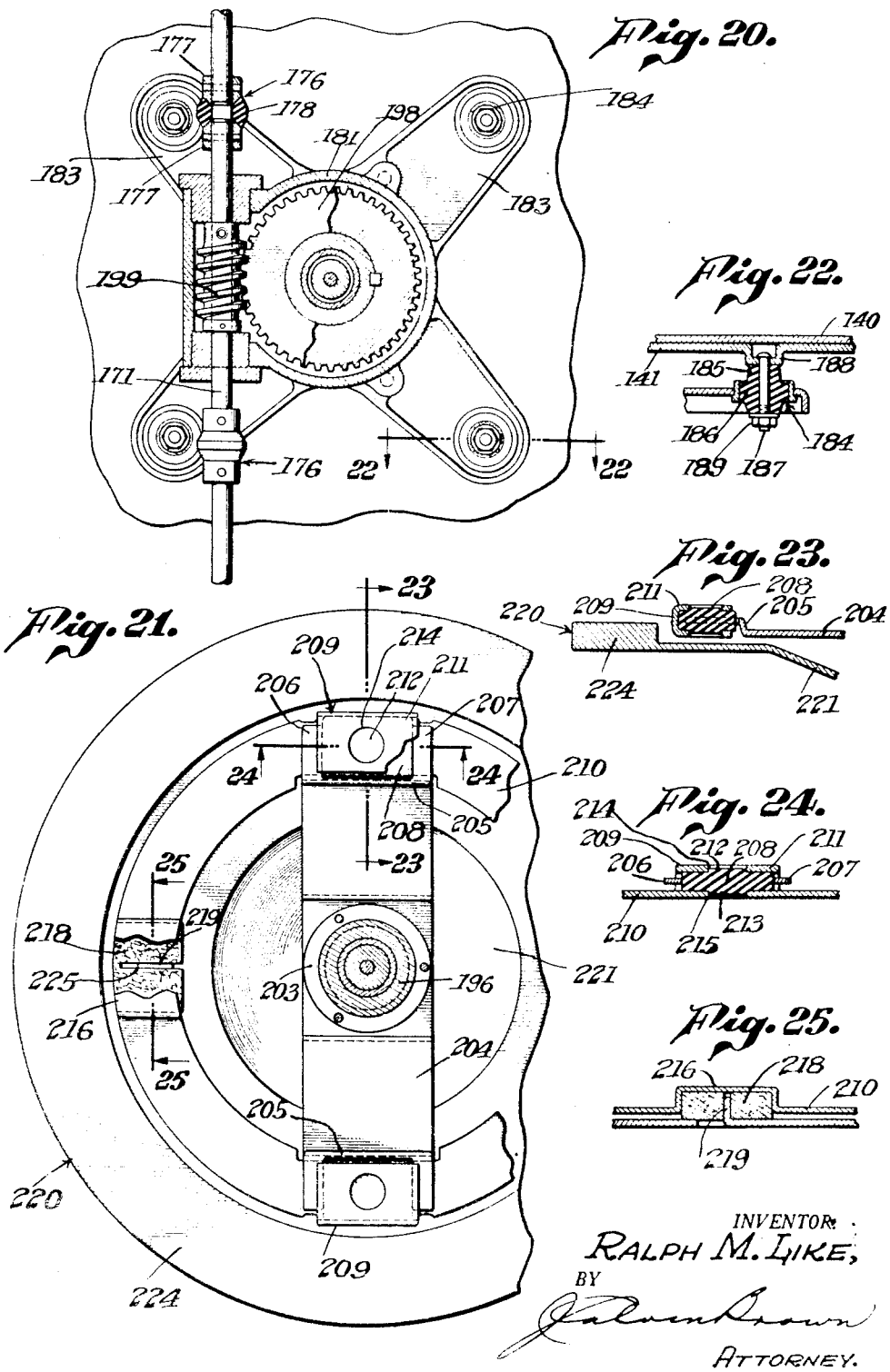

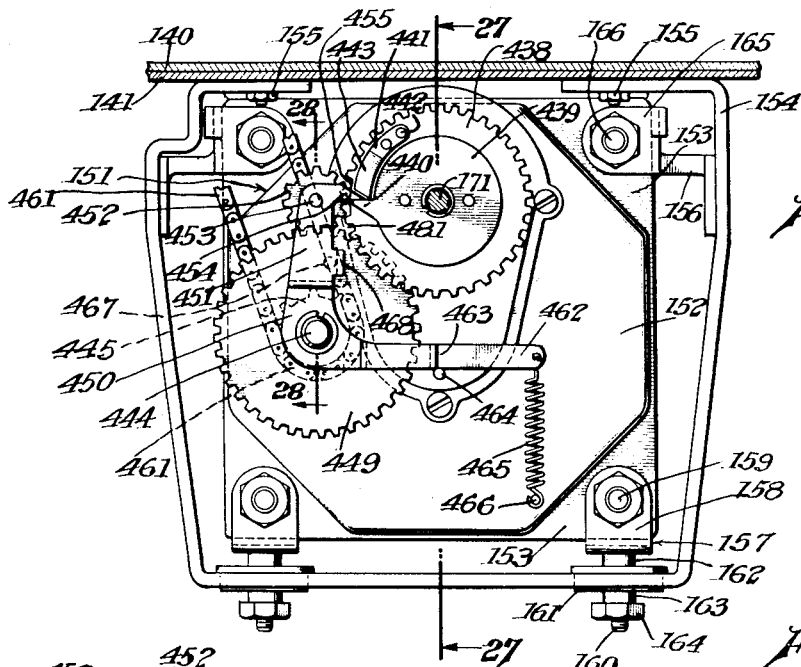
Fig. 26.
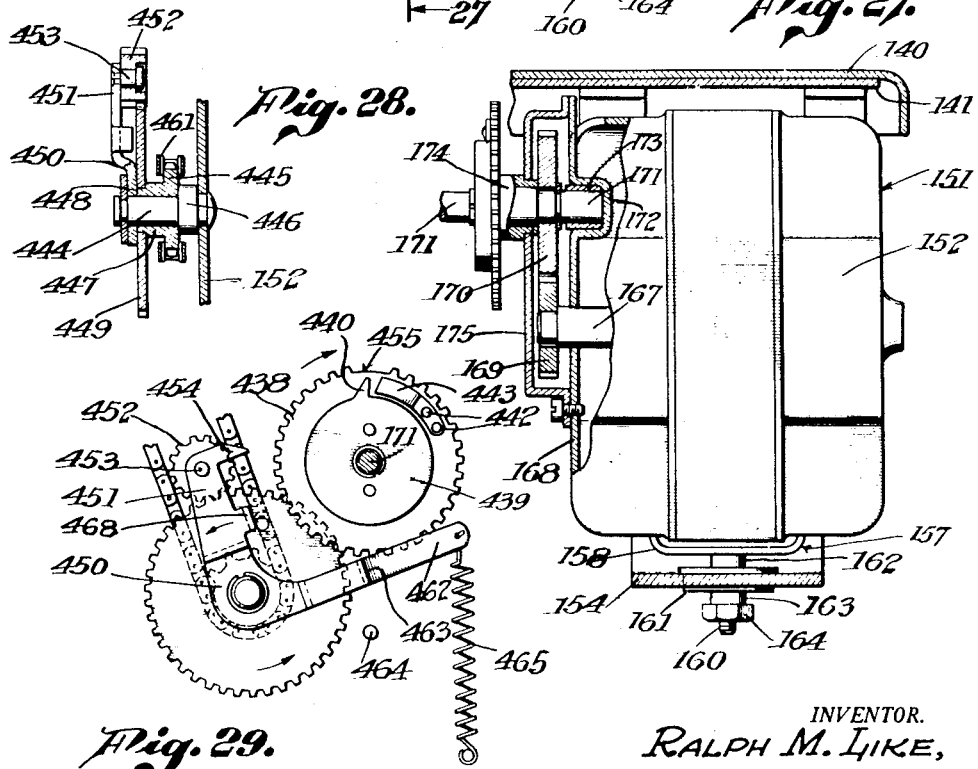
Fig. 28.
Fig. 27.
Fig. 29.
INVENTOR.
RALPH M. LIKE,
BY
ATTORNEY.

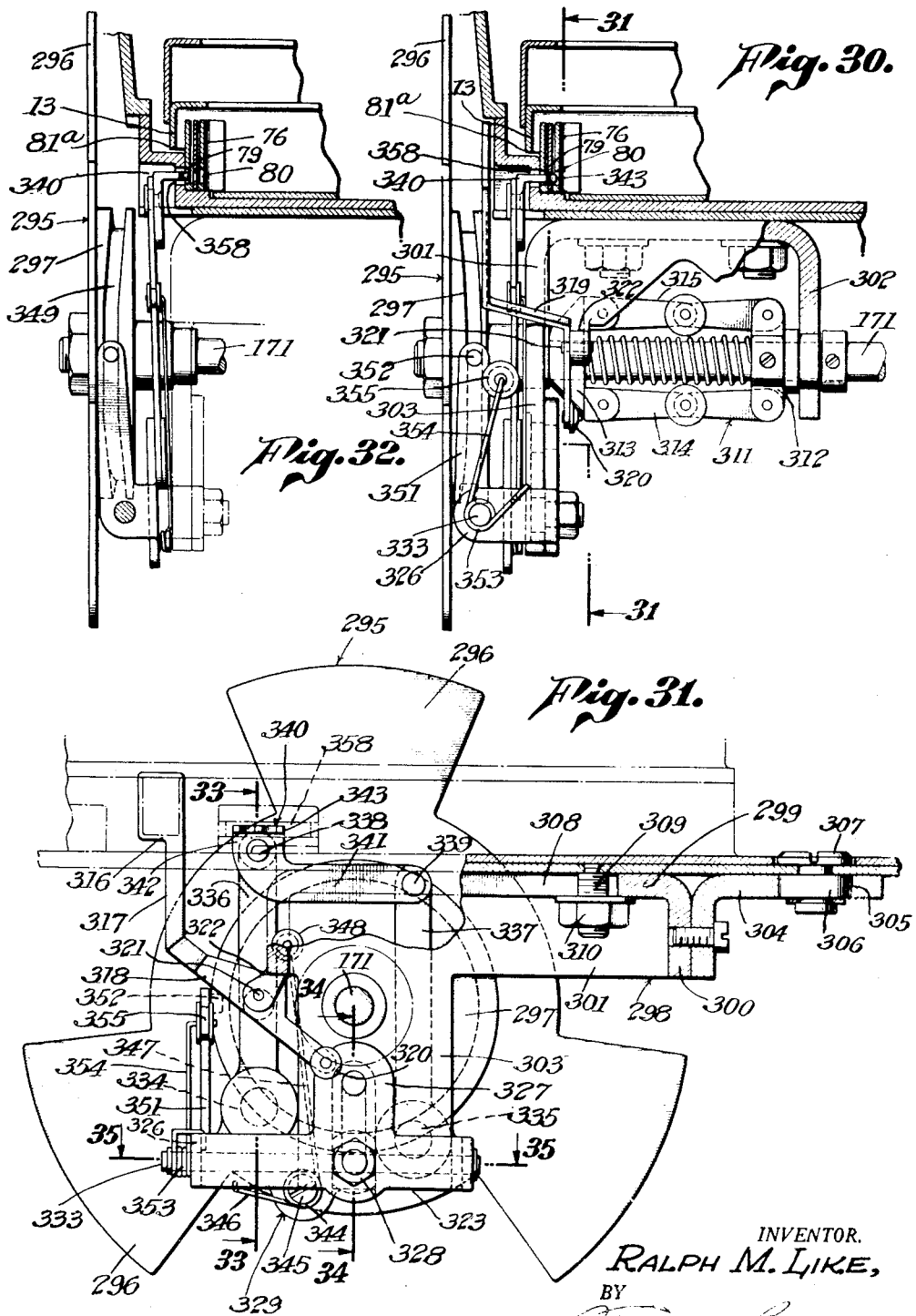

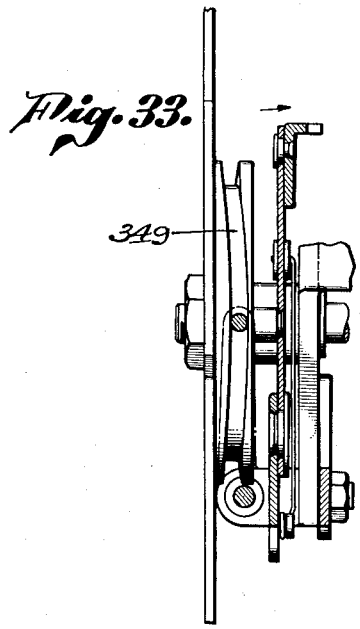
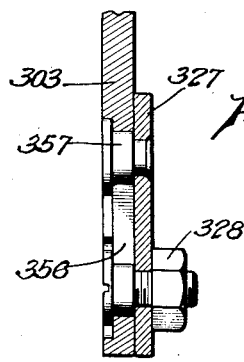
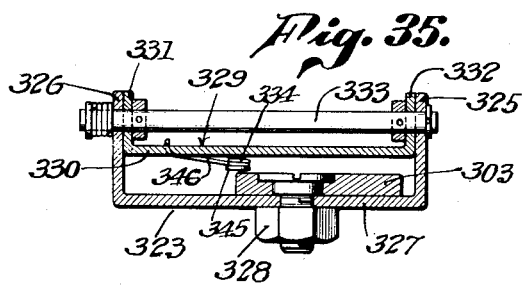
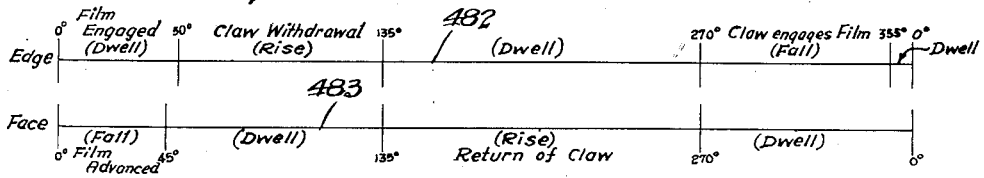
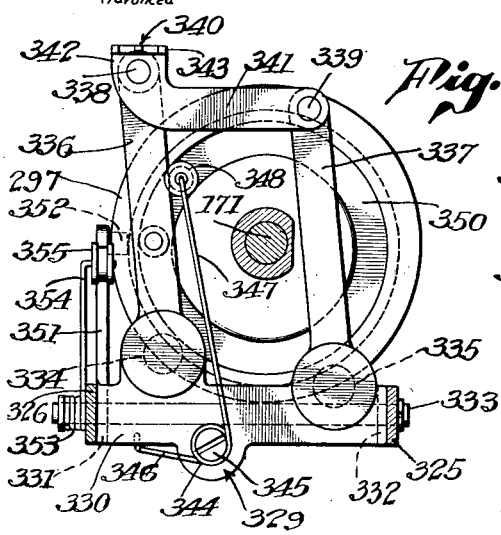
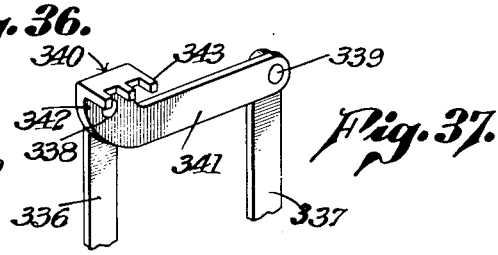

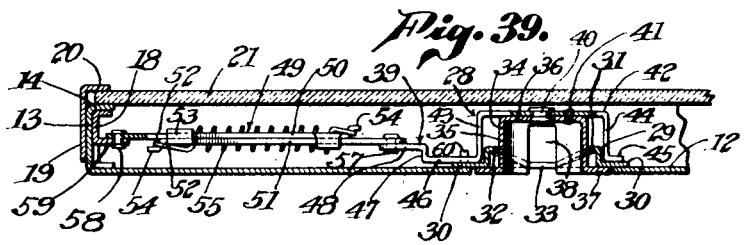
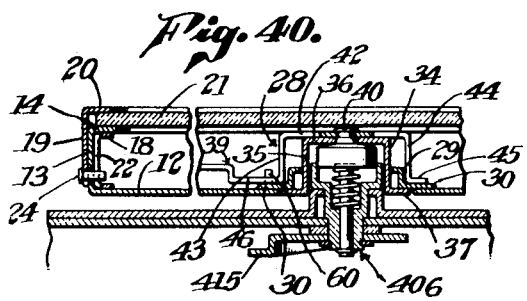
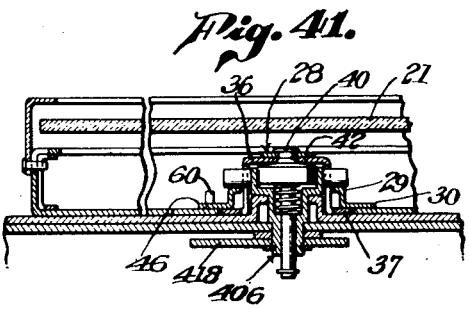
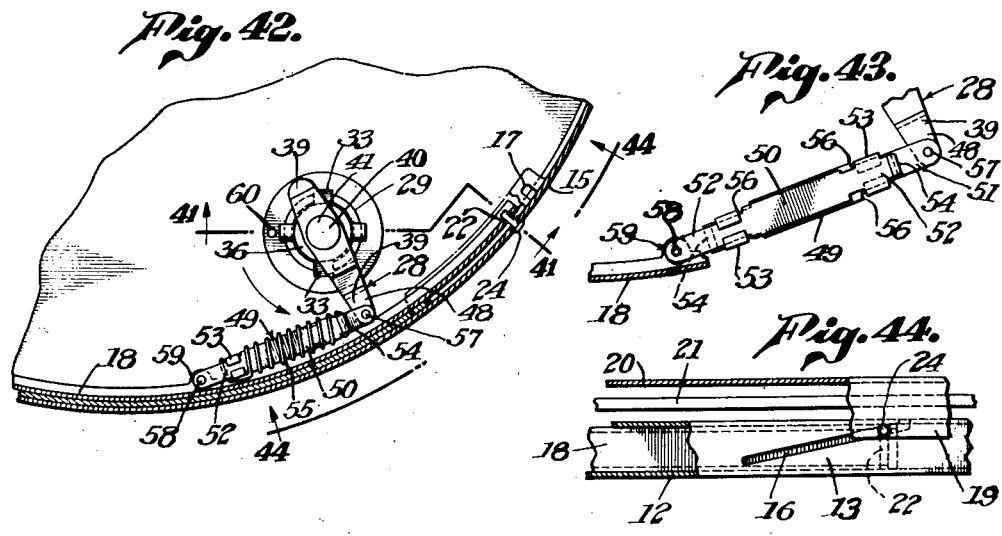
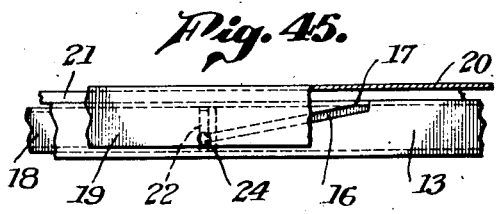
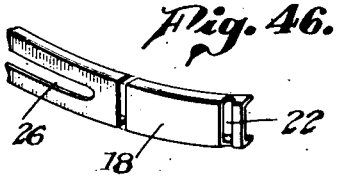

INVENTOR.
RALPH M. LIKE,
BY
ATTORNEY.

June 27, 1950          R. M. LIKE          2,512,724
COMBINATION SOUND AND PICTURE MECHANISM
Filed Nov. 1, 1948          14 Sheets-Sheet 14
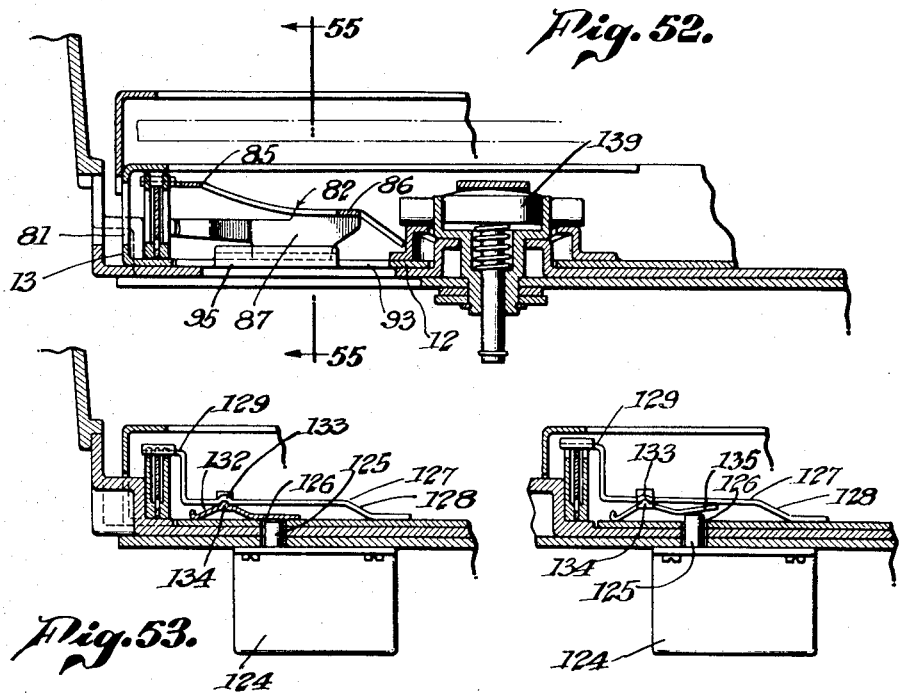
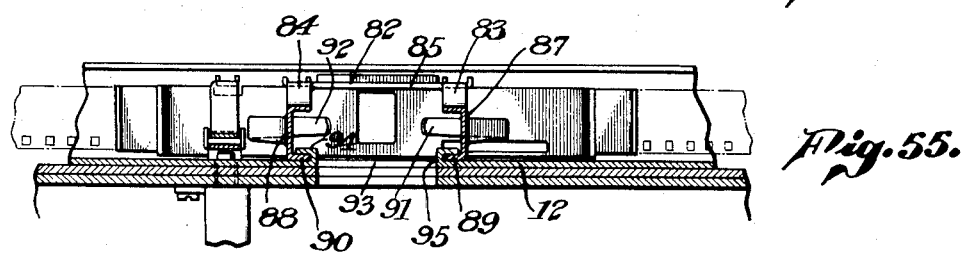
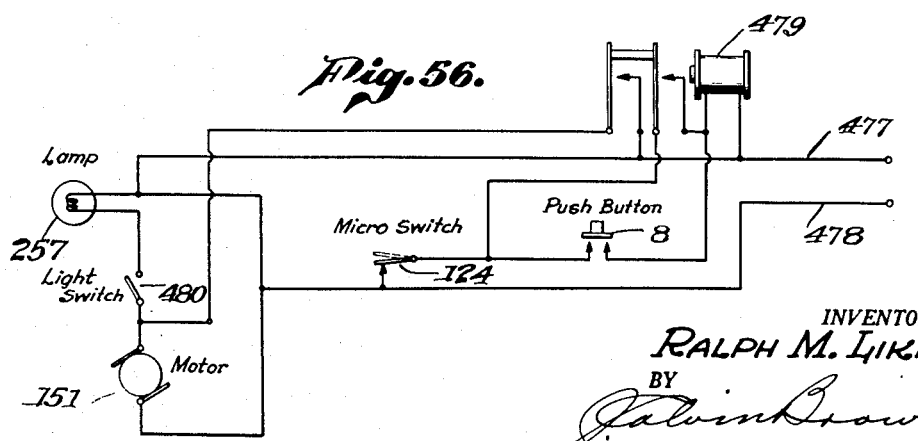
INVENTOR.
RALPH M. LIKE,
BY
ATTORNEY.

Patented June 27, 1950

2,512,724

UNITED STATES PATENT OFFICE 2,512,724

COMBINATION SOUND AND PICTURE MECHANISM

Ralph M. Like, Los Angeles, Calif., assignor to Phonovision Corporation of America, Los Angeles, Calif., a corporation of California Application November 1, 1948, Serial No. 57,768

8 Claims. (Cl. 88—16.2)

The present invention relates to a combination sound and picture mechanism and device, and constitutes an improvement upon my United States Letters Patent No. 2,378,416, for "Combination Sound and Picture Device," issued June 19, 1945.

The present invention includes a relatively thin case having a base and side wall with a disc record of approximately the same diameter as the case overlying the open top of the case. The case is adapted to house a continuous film, the images on which have relationship to the subject of the record. The combination case, film and record is adapted to be utilized with film-movement mechanism and means for projecting a light into the case and through the film, together with sound amplifying means and a pickup system for the record.

One of the difficulties to be overcome and which has been overcome by the present invention is the proper synchronization of the sound record with the picture record. This is particularly true where a case with its sound record is removed from a spindle and replaced by another record and film combination as the sound record and the film may be out of synchronization.

It is a feature of the present invention, and an object thereof, to provide means whereby sound on the record and the picture to be projected from the film are at all times maintained in synchronization.

The invention contemplates a case within which is a strip film, a sound record overlying the case and initially locked to said case in a definite position and not capable of being rotated relative to the case when so locked. It is intended that any number of individual cases, with accompanying records, be provided, and that such cases and records, either manually or automatically, be placed on a spindle whereby, after an initial lockdown of a case in a selected position, the accompanying record is released for rotation.

A device of the character of the present invention finds use not only in the home but in schools, churches, industry, by salesmen and others, as it is possible, with the present invention, to provide a talking moving picture affording entertainment or instruction, and providing a device which is simple of operation, low in cost, and capable of producing superior results.

As an adaptation, it is contemplated that a suitable cabinet be utilized, whether it be portable or a console, and which cabinet in either instance is provided with a screen, upon which is projected the picture. To this end, the invention includes, in addition to the case and overlying sound record, a means whereby light may be projected through the film contained within the case and onto the screen.

The problem of synchronizing sound and a picture record to be projected presents difficulties which the present invention has solved. A film gate mechanism is provided having a claw adapted to enter the perforations of the film for the purpose of intermittently moving the film. As is well known, the film must have loop portions in order that the film will move properly past the gate when the film movement mechanism is in operation. When the strip film is of the continuous type, such as used in the present invention, unless the record and the film at all times stop at a definite position, or are capable of being brought to a definite position, the sound and the picture record may cease to be in synchronism. This is easily demonstrated. Suppose a first record with its film has completed its run on the machine and the case is removed—if a second case is placed upon the machine and locked down, its record being released, the film movement mechanism in said case and the sound track of the record may not be in the same position as the film and record of the previous case. Thus, the film movement claw may move or slide against the film until it engages the perforations of the film, and in so doing, the sound on the record moves out of synchronism with the strip film.

Continuous playing of different records with different positions for the film movement claw will readily demonstrate that, after a few records have been played, the strip film within each case will gradually lose its loop, resulting in the film and the record being completely out of synchronism. The present invention overcomes this fault, with the result that the film sequence is in synchronism with the sound record, and regardless of the number of playings thereof.

With the above mentioned and other objects in view, the invention consists in the novel and useful provision, formation, construction, association, and relative arrangement of parts, members and features, all as shown in certain embodiments in the accompanying drawings, described generally, and more particularly pointed out in the claims.

Figure 47:
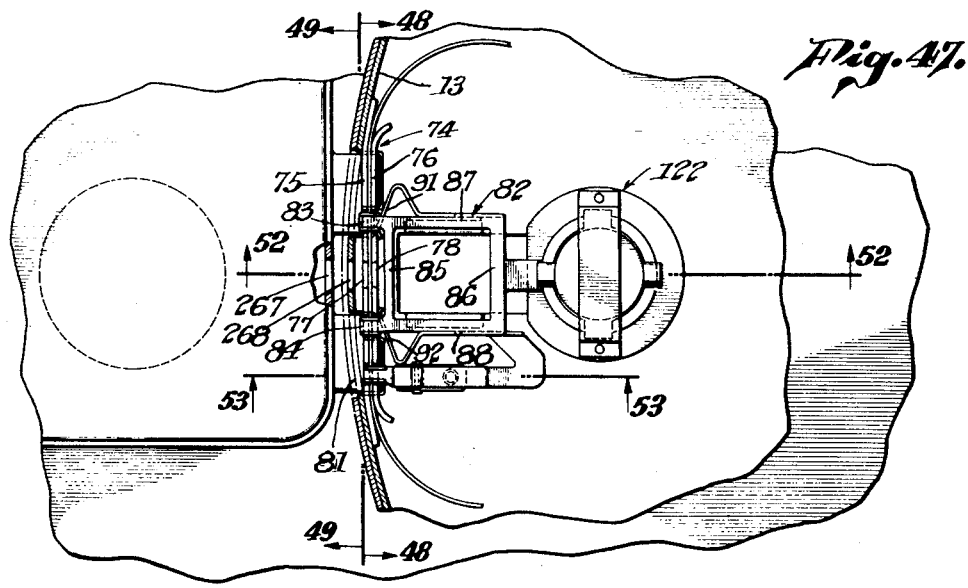
Figures 48, 49:
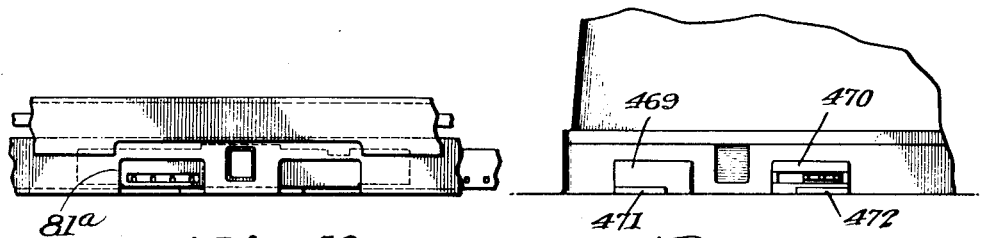
Figure 50:
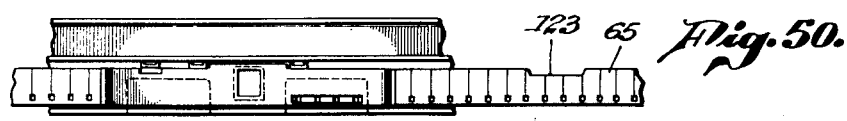
Figure 51:
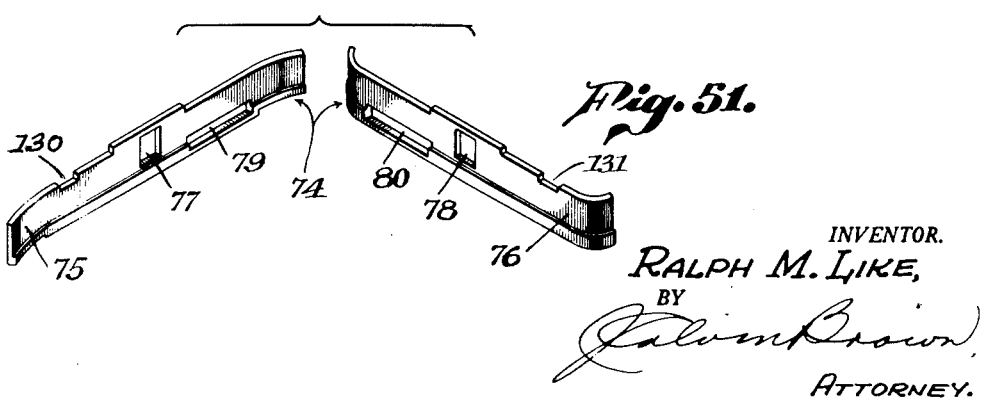

In the drawings:

Figure 1 is a top plan view of a device incorporating the combination picture and sound mechanism, Figure 2 is a side elevation of the device shown in Figure 1, Figure 3 is an end elevation of the device shown in Figures 1 and 2, Figure 4 is an enlarged view of Figure 1, the record being removed from its case and the tone arm being in a moved position, Figure 5 is a plan view of the mechanism within the cabinet and utilized for the purpose of projecting an image and likewise rotating the sound record, together with re-synchronization mechanism and mechanism for controlling movement of the tone arm, Figure 6 is a sectional view on the line 6—6 of Figure 4, and on an enlarged scale, Figure 7 is a sectional view on the line 7—7 of Figure 6, Figure 8 is a fragmentary sectional view, on an enlarged scale, of means for locking the record to the spindle, Figure 9 is a fragmentary view, partly in section, taken on line 9—9 of Figure 4, Figure 10 is a fragmentary sectional view on the line 10—10 of Figure 9, Figure 11 is a vertical sectional view of certain optical elements of the invention, Figure 12 is a plan view of mechanism utilized in re-synchronizing a picture record on strip film with its sound accompaniment, Figure 13 is a fragmentary perspective view of mechanism for releasing the sound record from the spindle, Figure 14 is a fragmentary perspective view of mechanism for releasing the sound record from the spindle, Figure 15 is a fragmentary sectional view on the line 15—15 of Figure 12, Figure 16 is a fragmentary sectional view on an enlarged scale, and taken on the line 16—16 of Figures 4 and 19, Figure 17 is a view similar to Figure 16, certain of the parts being in moved position, the said view being taken on the line 17—17 of Figure 18, Figure 18 is a view looking in the direction of the arrow 18 of Figure 17, Figure 19 is a view looking in the direction of the arrow 19 of Figure 16, Figure 20 is a fragmentary view, partly in section, taken on the line 20—20 of Figure 6, Figure 21 is a fragmentary sectional view on the line 21—21 of Figure 6, Figure 22 is a fragmentary sectional view on the line 22—22 of Figure 20, Figure 23 is a fragmentary sectional view on the line 23—23 of Figure 21, Figure 24 is a fragmentary sectional view on the line 24—24 of Figure 21, Figure 25 is a fragmentary sectional view on the line 25—25 of Figure 21, Figure 26 is an enlarged detail, partly in section, of a portion of the re-synchronizing mechanism, said view looking in the direction of the arrow 26 of Figure 5, Figure 27 is a fragmentary, partly sectional view, on the line 27—27 of Figure 26, Figure 28 is an enlarged detail, partly in section, on the line 28—28 of Figure 26, Figure 29 is a detail of part of the re-synchronizing mechanism shown in Figure 26, and in a moved position, Figure 30 is a fragmentary view, partly in section, illustrating and showing the record face and strip film, together with claw film movement mechanism, Figure 31 is a sectional view on the line 31—31 of Figure 30, said figure showing the film movement mechanism and a shutter, Figure 32 is an elevation, partly in section, detailing the means for moving a claw to produce movement of strip film, the claw being in a moved position from that of Figure 30, Figure 33 is a partially sectional view of the claw mechanism, being taken on the line 33—33 of Figure 31, Figure 34 is a sectional detail on the line 34—34 of Figure 31, Figure 35 is a sectional view on the line 35—35 of Figure 31, Figure 36 is an elevation of the claw and cams for moving the claw, Figure 37 is a fragmentary, perspective view of the claw, Figure 38 is a line diagram illustrating the relationship between claw movement and movement of the film, Figure 39 is a fragmentary, sectional view on the line 39—39 of Figure 4, Figure 40 is a fragmentary, sectional view of means which is utilized for balancing the sound record and its case when the record and case are placed on the spindle, this view being taken on line 41—41 of Figure 42, and prior to locking the case and releasing the record, Figure 41 is a view similar to that of Figure 40, the case being locked against movement and the record being released, this view being taken on the line 41—41 of Figure 42, Figure 42 is a fragmentary transverse section illustrating the locking and unlocking means for the record, Figure 43 is a fragmentary view, partly in section, and showing one of the spring links utilized in conjunction with means for releasing the record from its case, Figure 44 is a fragmentary sectional view looking in the direction of the arrows 44—44 of Figure 42, Figure 45 is a fragmentary, partially sectional view, similar to that of Figure 44, and showing the parts in moved relationship, Figure 46 is a fragmentary perspective view of one of the ring members utilized in the construction shown in Figures 44 and 45, being the ring to which the link shown in Figure 43 is attached, Figure 47 is a fragmentary, partially sectional view of the gate end of the device, Figure 48 is a fragmentary view taken on the line 48—48 of Figure 47, Figure 49 is a fragmentary view, taken on the line 49—49 of Figure 47, the section lines being omitted, Figure 50 is a fragmentary view, showing a portion of the strip film, the claw, and the aperture, Figure 51 is a perspective view of the two members of the gate, Figure 52 is a sectional view on the line 52—52 of Figure 47, Figure 53 is a sectional view on the line 53—53 of Figure 47, showing a micro-switch and means for actuating the same, Figure 54 is a view similar to that of Figure 53, the micro-switch being closed, Figure 55 is a sectional view on the line 55—55 of Figure 52, and, Figure 56 is a wiring diagram showing circuits between the micro-switch, a relay, and the motor for rotating the record and driving the film movement mechanism.

Referring now with particularity to the drawings, I have shown in Figures 1, 2 and 3, an adaptation of the invention in a small cabinet 1.

Such a type of cabinet might be portable and for use in a home or by salesmen. Carried on a spindle is the combination case 2, which includes a self-contained continuous strip film and a record. The usual tone arm 3 is provided, the needle of which engages the record groove. It is intended that the combination case 2 should be constructed so as to be removable from the spindle whereby another combination case may be placed on the spindle.

As will be set forth later, other arrangements of controls may be resorted to, although I have shown in Figure 2 a plug-in for an electric cord at 4, a remote large speaker connection at 5, a main switch control at 6, volume control 7, and a starting switch in the form of a push button at 8, together with a lever 9 which, when moved from the dotted line position to the full line position of Figure 1, will swing the tone arm from the dotted line position of Figure 1 to the full line position, or starting position, for the playing of the record, and likewise lock the case which houses the film movement mechanism against movement, and at the same time release the record so that the spindle may rotate the same. In addition, the mechanism associated with the lever 9 re-synchronizes the sound record with the film when the lever is revolved from the full line position shown in Figure 1 to the dotted line position.

A housing or cover 10 overlies the prefocused incandescent bulb. A screen for receiving the projected image may be provided in the side of the cabinet, or the image may be projected through an opening in the cabinet and onto a screen, placed some distance from the cabinet, depending upon use of the invention. It is intended that the tone arm 3 should move from the inside of the record to the rim thereof. Furthermore, the inside of the record is provided with two or more spaced-apart spiral grooves which lead to the main groove, whereby, upon a few turns of the record, the needle is positioned in the sound groove.

The combination case 2 will first be described, reference being made to Figures 4, 6 and 9.

A case 11 includes a base 12 and a circular rim flange 13. The case is quite shallow and open at the top. The flange 13 is provided at its top edge with spaced, inturned segmental flanges 14 and 15. It is to be observed that there are four segmental flanges 14 and four segmental flanges 15, with the flanges 15 of greater length than 14. The flange 13 is provided at spaced points and adjacent the segmental flanges 15, with inclined slots 16 which extend from the base 12 of the case to the top edge of the flange (see Figures 44 and 45). The slots 16 terminate adjacent the top edge of flange 13 and communicate with right-angle slots 17, formed in the flanges 15 (see Figure 42).

Within the case are a pair of spaced apart slides 18. These slides are channeled in cross section, conform to the curvature of the flange 13 and are of a length or arc which permits them to extend between two of the segmental flanges 15 and under a flange 14, as see Figure 4. Concentric with the flange 13 is a ring 19 (Figure 6), provided with inturned flange 20. The ring 19 with its flange 20 functions to clamp or release a record 21 as, for instance, illustrated in Figures 39 and 40, wherein it will be observed that the record 21 is clamped between flanges 14 and 20, while in Figures 6 and 41, the record is shown in released position. Movement of ring 19 from record-clamping to record-releasing position is caused by movement of the slides 18. Each slide 18 adjacent its ends is provided with a transverse slot, as shown at 22 and 23 (Figures 4 and 46). Pins 24 and 25 extend transversely of the flange 19 through a spaced pair of the inclined slots 16 in flange 13 and likewise through the vertical or transverse slots 22 and 23 of each slide.

The pins 24 and 25 are spaced apart a distance equal to the distance between the ends of slots 16 at the base portion 12 of the case. Thus, movement of a slide 18 will move the pins 24 and 25 within the inclined slots 16, such slots acting as cams for the pins, to raise the ring 19 from the position shown in Figure 40 to the position shown in Figure 41, the pins likewise moving within the vertical or transverse slots 22 and 23 of the slide. Each slide is provided with a longitudinal slot 26 (Figure 46), and a pin 27 extends through the flange 13 and into said longitudinal slot to aid in guiding movement of the slide. The longitudinal slots 26 are of a length sufficient to permit complete movement of the pins 24 and 25 within the cam slot 16.

Means 28 actuates the slides 18 to effect raising and lowering of ring 19. The means 28 is detailed as to its several component parts in Figures 39 and 43 and said means includes a cam member 29, the cam being formed from an annulus 30 which is provided with two diametrically disposed spaced cam portions 31 and 32, with a diametric way 33 therebetween (Figures 39 and 42). The cam member 29 surrounds a revolvable member 34, said member 34 having a cylindrical side wall 35, a top 36, and a flanged base 37. Base 37 engages the annulus 30 and has a thickness equal to the thickness of the base 12 of the case. The cylindrical side wall 35 is provided with a pair of diametrically positioned transverse slots 38, which extend through the base flange 37 to a point terminating just under the top 36.

A lever 39 is secured to the member 34 by a rivet 40 and pin 41. This lever is bent so as to have a portion 42 which overlies the top 36, a pair of leg portions 43 and 44 which substantially parallel the cylindrical wall 35, the leg 44 having a foot 45 adapted to engage the annulus 30, while the leg 43 terminates in a part 46, likewise engaging annulus 30, whereby to stabilize movement of the lever when it is turned, it being observed that the cam member 29 has a portion thereof interposed between flange 37 and the foot portion 45 and portion 46. The lever is offset at 47 and terminates with piece 48. The lever is connected to a link 49, which link is in two parts, 50 and 51, the parts overlying. Each part is reduced in width at a portion of its length as shown at 52, and each part is provided with a clip 53, adapted to embrace the other link part. Each link part is provided with an angular lug 54. A coiled spring 55 surrounds both parts 50 and 51, with ends of the spring engaging the lugs 54. This spring constantly resists separation between the two parts of the link or to assume the position illustrated in Figure 43, wherein it will be seen that the clips 53 engage the shoulders 56.

Link part 51 is pinned at 57 to piece 48 of the lever 39, which part 50 is pinned at 58 to a projecting lug 59 on slide 18. The spring actuated link permits toggle movement when the lever is rotated to its extreme position, in either direction, and furthermore prevents damage through movement of or resultant upon movement of the slides 18, when the slides reach the excursion of their movement as the lever may continue to rotate slightly, which will cause tension in the spring 55. This permits the lever to lock after raising the ring 19 and which will likewise lock the lever when the ring 19 is lowered to the position of Figure 40.

The arrangement of the lever 39, the revolvable member 34, and annulus 30, is such as to properly center these members and allow a turning of the lever and member 34 without the use of a central pivot. As shown in Figures 39 and 40, I provide a stop pin at 60 for limiting rotative movement of the lever 39 in one direction. The part 46 is adapted to engage the pin when the levers are in the position shown in Figure 4. In this position, it will be observed that each lever and associated link is at a slight angularity.

An interrupted ring 61 is positioned coaxially within the case 11. This ring is provided with a top flange 62, the flange formed with spaced lugs 63, and included between each lug and the base 12 are spools 64. A continuous strip film 65 is coiled around the ring 61 and supported on the spools 64, with the lower edge of said coil of film resting upon rollers 66. The rollers 66 are radial to the ring 61, and held between members 67 and 68, which extend above the periphery of the rollers. The top flange 62 is provided at spaced points. with lugs 69 adapted to overlie the film coil and hold the same positioned on the rollers 66 and against the spools 64.

A bracket 70 is secured to the base 12, overlies the film coil, and carries an enlarged spool 71, which engages the inner coil of the film. A bracket 72 is secured to base 12 (external the film coil) and carries a spool 73.

A gate 74 is provided adjacent the rim 13 of the case, this gate includes a pair of plates 75 and 76 (see Figure 51). One plate 75 acts as the trough, while the other plate 76 acts as a pressure plate, the two members of the gate are both provided with apertures 77 and 78, and with slots at 79 and 80. The slots 79 and 80 are adapted to accommodate certain of the film movement mechanism, to-wit: a claw to be hereinafter described. Both plates of the gate are provided with base flanges for the purpose of separating the plates slightly and to permit movement of the film therebetween without rubbing the film surface. The plates of the gate cooperate so that the apertures and slots are in alignment.

The flange 13 of the case is cut away at 81 (see Figure 47) for reasons hereinafter set forth.

For holding the gate in position, I provide a member 82 (see Figures 47, 52 and 55) which member includes a pair of spaced fingers 83 and 84 which overlie the top edges of both plates of the gate for holding the gate against vertical movement. Transverse pieces 85 and 86 are secured to the fingers. The fingers are provided with side flanges 87 and 88, the flanges having angular inturned portions 89 and 90. The flanges 87 and 88 are formed to provide bent spring fingers 91 and 92, the ends of which engage the pressure plate for urging the plate toward the trough plate. The base 12 of the case 11 is slotted at 93 and the said case boundary said slot is provided with returnedly bent portions 94 and 95, functioning as clips, to receive and confine the portions 89 and 90 of member 82.

The record 21 is provided on its base surface— that is, the surface that does not have the sound groove—with an enlargement 96. That is to say, the record is annularly thickened. The record 21 is centrally provided with an angle-sided bore 97, and in the present instant said opening is triangular in form. A sprocket member 98, Figure 6, is provided with a triangular top portion 99 adapted to fit within the triangular bore 97, the portion 99 acting as a drawing plate for the record, the record resting upon flange 100. A plate 101 secures the record to the sprocket. The sprocket has a circular wall 102, a bottom flange 103, and secured to the circular wall is an annular series of spaced pins 104. Immediately below the flange 100 and spaced therefrom is an internal annular flange 105. This construction provides an annular space 106 as between the top flange and the internal flange. Positioned on the bottom surface of flange 105, is a pair of diametrically positioned teeth or lugs 107 and 108. These lugs are adapted to co-engage with the teeth of a spindle for rotating the record, as hereinafter described.

A member 109 (Figures 4 and 7) is adapted to hold pads 110 and 111 adjacent the periphery of the sprocket member. Member 109 includes a frame having side pieces 112 and 113 and angular end pieces 114 and 115. The end pieces are provided with upright posts 116, 117 and 118, the posts 116 and 118 being in alignment, while post 117 is offset, but centered in relation to the other two posts. Extending between posts 116 and 118 are bars 119 which carry the pads 110 and 111. It will be noted that each bar 119 has flanged ends which are transversely grooved. Adapted to extend between said ends and to engage the posts 117 are bowed leaf springs 120. The pads are therefore constantly urged against the film 65 to maintain the film perforations in engagement with the sprocket pins or teeth 104. These pads fit in the space included between the upper and lower flanges 100 and 103 of the sprocket member. Each pad is provided with a circular channel or way 121 so as to accommodate the sprocket teeth or pins 104. The member 109 is secured to the base 12 by means of pins. Thus in Figure 4 the coil or roll of continuous film 65 is passed over the spools 64, and a length thereof is passed over the idler roller 71, between the pad 111 and the sprocket member, the perforations of the film engaging the teeth 104, twisted, then slightly looped, passed through the gate, then between the pad 112 and the periphery of the sprocket member, twisted, then passed around the idler spool 73, the film joining the outside of the coil or roll. It is intended that film movement should be in the direction of the arrow of Figure 4. Thus, the film moves from the inside of the loop or coil to the outside thereof.

Directly positioned between the roll of film and member 82 is member 122, which is identical in construction with the means 28 for actuating ring 19, save and except that said member is not provided with a lever 39 nor a connecting link 49. Otherwise, the construction is identical with the remaining elements of the means 28, and the same numbers of reference will apply thereto. Furthermore, the pair of means 28 is spaced an unequal distance from the member 122. This allows for a proper positioning of the record case relative to the cabinet top and other mechanisms, as hereinafter set forth.

It is mentioned at this time that the strip film 65 is notched at 123, Figure 50. A switch lever engages the top edge of the film and when the switch arm falls within the film notch a microswitch is operated. As the means for controlling operation of the microswitch is within the case 11, it will be described at this time, reference being had to Figures 53 and 54. The microswitch is shown at 124, and said switch is fastened within the cabinet which contains the mechanism for rotating the record. The microswitch has a button 125 which permits opening or closing of the switch, and said button extends through an opening 126 in the base 12 of the case 11. Secured within the case and to the base 12 is a lever 127, this lever has an offset portion at 128 and a part 129 adapted to overlie the gate and the film. Both members of the gate are provided with aligned notches 130 and 131, Figure 51, which have a depth equal to the depth of the notch 123 of the film. The part 129 is adapted to be received in said notches 130 and 131 when the notch 123 of the film is reached during film movement. Positioned immediately beneath the lever 127 is a lever 132, and this lever has a portion adapted to overlie the button 126. In the construction shown, the lever 127 is provided with a socket 133, which lever 132 has a bowed portion formed with a round protuberance 144 fitting within said socket 133. As shown in Figure 54, when the part 129 is riding on the top of the film and prior to reaching the notched portion 123 thereof, the lever 132 has one end raised, as shown at 135, which permits the button 125 to assume the position shown at Figure 54, at which time the microswitch is closed.

Secured within the case is a bracket 136 (see Figures 4 and 9), the upper end of which carries a pin 137. As shown in Figure 10, the enlarged portion of the record is provided with an annular series of spaced slots 138, and when the record is moved from the position of Figure 9 to that of Figure 40, the pin 137 will enter one of said slots to lock the record against rotation. The record, when locked against rotation by the pin 137 also prevents any movement of the strip film within the case, and hence, as will be pointed out hereinafter, the synchronization that exists between the record and the film is maintained.

This locking prevents unauthorized attempts to revolve the record, which would affect synchronization with the film. By way of summary, it will be seen that I have provided a case with an overlying record, which record is adapted to be clamped against movement by suitable means within the case, that the case contains a continuous strip film adapted for movement when the record is rotated, and that I provide means for stopping record rotation after the record has been played and the picture accompaniment, therefore, has ended. I have also provided a means within the case, whereby the case may be locked to the cabinet and a gate adapted to be aligned as to its aperture with certain projection mechanism, so that the photographs on the film may have a light projected therethrough.

The cabinet 1 is provided with a top plate 140, and immediately therebeneath a sub-plate 141 (see Figures 6 and 9). The sub-plate is provided with a curved edge flange received between the sides 142 of the cabinet. The top plate and the sub-plate are secured together in any convenient manner. Angled brackets 143 are attached to interior surface of the sides 142 at spaced points and said sub-plate is supported by said angled brackets by means 144. Said means constitutes a rubber button having an enlarged head 145, provided with an annular groove 146 for receiving the bifurcated end 147, of a bracket 148 secured to the said plate. The button 145 has an axial bore through which is passed a bolt 149, the bolt passing through a bore in bracket 143. It will be noted that the bolt is headed, the head resting on the top surface of the button, while a nut is carried by the bolt for engagement with the undersurface of bracket 143. In this manner, the button resiliently supports the sub-plate. This main plate is provided with an annular flange 150 which fits within a central opening of the sub-plate.

For the purpose of driving various instrumentalities of invention, I have provided a motor 151. This motor is illustrated in Figures 26 and 27 and is secured to the sub-plate 141. The method of securing is by a vibration dampener so that vibration is not communicated to various parts of the machine as a whole and which might be audible to the listener. In fact, it is a principle and feature of the present invention that all vibrating parts have vibration dampeners. In particular, the motor 151 has its casing 152 provided with a centrally disposed and encircling flange 153. A bracket 154 surrounds the motor casing in the zone of the flange 153, the bracket being secured to the sub-plate in any convenient manner, such as by bolts 155. Extending between the flange 153 and the bracket are upper and lower mounts 156 and 157. The mounts 157 include a stirrup or U-shaped member 158, which is secured to the flange 153 by means of a bolt 159 passed through ends of the stirrup and the flange. A bolt 160 centrally depends from the stirrup and a rubber disc 161 is received within a bore of the bracket 154 and anchored in said bracket. Spacer washers 162 and 163 are interposed between the mount and the stirrup and between the mount and nut 164 carried on the bolt 160. The mounts 156 include a stirrup portion 165 bridging the flange 153 at the upper portion thereof and held to said flange by bolts 166. A rubber disc may be provided for this type of mount, although one is not shown in the present instance due to the fact that the weight of the motor is carried by the mounts 157. The motor shaft 167 is passed through the front wall 168 of the motor casing and carries a pinion 169 adapted to mesh with gear 170 mounted upon a shaft 171.

The front wall 168 of the motor has a socket or concavity 172 and the bushed end 173 of the shaft 171 is confined in the said socket. As shown, shaft 171 has portions of different diameter, so as to render assembly of the gear 170 and bushing thereon of easy accomplishment. The shaft extends through a bearing 174, which bearing is passed through an opening in cover 175 adapted to enclose pinion 169 and gear 170, the cover being secured to the wall 168 of the motor.

As shown in Figure 5, shaft 171 is made up of a series of coaxially arranged sections interconnected by means of rubber couplers 176. These couplers are of the type which includes a pair of spaced collars 177 and an interposed rubber button 178 connecting the same (see Figure 20). Couplers of this type compensate for any axial misalignment of the various shaft sections and reduce vibration. The shaft directly connects to means designated generally as 179 for rotating record 21. This means is detailed in Figures 6 and 9.

Means 179 includes a gear box 180 comprising a body 181 and cover 182, the cover being provided with radial arms 183, there being four of said arms in the present embodiment of the invention equidistantly spaced apart. The arms are secured to the sub-plate 141 by rubber mounts 184. Such rubber mounts are conventional in the industry and comprise an annulus having portions of different diameter 185 and 186, through which is passed a bolt 187, which bolt has one end secured to part 188 of the sub-plate 141, with the opposite end passed through the mount, the entirety being held by a nut 189 carried by the bolt. It will be noted that the portion 186 has a surrounding ring which is received and held within an opening of the arm (see Figure 22). The mount is not unlike the rubber mount for the motor. The cover is provided with a central sleeve bearing 190 (Figure 6), which extends entirely through and beyond the body of the gear box. This central bearing is of a sleeve type and is of reduced external diameter for a portion thereof, as shown at 191, and enlarged as to external diameter at 192, the enlarged portion extending exteriorly and interiorly of the cover, so as to give rigidity to the bearing. The body 181 and the cover are held in working relationship in any convenient manner, such as by screws 193, and said body has a bearing portion 194 in the base 195 thereof. This bearing is concentric with the bearing 190.

Interposed between the bearing 194 and the external surface 191 of bearing 190 is a spindle 196. This spindle has keyed thereto at 197, gear 198, which gear meshes with worm 199, mounted upon one of the shaft sections of shaft 171. It will be observed that the side wall 200 of the bear box body is formed to confine worm 199 and that the side wall is provided with end bearing portions (see Figure 20) for the shaft section. I have shown in Figure 6 a thrust washer 201 upon which the gear 198 rests, together with a retaining ring 202 for the opposite surface of said gear and for holding the gear against vertical movement relative to the spindle 196.

The lower end of the spindle 196 is provided with a flange 203, and secured to said flange is a spider 204 (see Figure 21). This spider comprises a diametric piece secured to the flange 203 of the spindle 196 in any convenient manner, the spider being offset at each end, as shown at 205, and bifurcated to provide portions 206 and 207. Interposed between the bifurcations of each end of the spider is a rubber disc or filter block 208, the block being confined by means 209 carried by annulus or ring 210 at diametric portions of said annulus. The means 209 comprises a returnedly bent member 211 spacedly overlying a portion of the annulus, and adapted to house and clamp as between the surface of said annulus and said member 211, the filter block 208. The filter block on its opposite surfaces is provided with circular enlargements 212 and 213, which are fitted within bores 214 and 215 in the returnedly bent portion and the annulus, as best illustrated in Figure 24. This assures against any shifting movement of the block.

Positioned 90 degrees from the means 209 and formed in the annulus 210 are diametrically positioned depressed or cup portions 216 and 217 (see Figure 6). Each depressed portion confines a filter pad 218. In the present instance, the filter pads are formed of felt. Each felt pad is transversely slotted for a portion of its width, as shown at 219.

Positioned immediately below the ring or annulus 210, which shall be known hereinafter as the "filter ring", is fly wheel 220. The fly wheel comprises a disc having a concavo-convex portion 221 (Figure 6), which interconnects with a central sleeve or hub 222 and a flat disc 223 provided with a thickened annular rim 224. The disc 223 is provided with a diametrically disposed pair of vertical tongues 225 and 266 and the spacing between said tongues is such as to permit their reception within the slots 219 of the filter pads 218 confined in the depressed or cup portions 216 and 217. Thus, the filter ring has a diameter which permits its placement within the confines of the thickened annular portion of the fly wheel (see Figures 6, 9 and 21).

A spindle 227 extends through the bearing 190 and has one end thereof keyed at 228 to the fly wheel and specifically to the hub or sleeve portion 222, the spindle being held therein against vertical movement in one direction by a snap ring 229. The opposite end of the spindle is provided with a flange 230 (Figure 8). This flange has a portion which extends at substantially right angles to the axis of the spindle, as shown at 231, and an annular portion concentric with the spindle axis, as shown at 232. The external portion of part 192 of the cover is annularly recessed, at 233, and adapted to be confined within said recess are thrust bearings 234, these thrust bearings being interposed between the cover and the spindle flange 230, with the annular flange 232 surrounding the portion 192, as best shown in Figure 8.

The spindle flange is provided with an annular series of crown teeth 235 (Figures 6, 8 and 9). The spindle 227 continues beyond the top of the flange, as shown at 236, and this portion is diametrically slotted at 237. Furthermore, the spindle is provided with a central bore 238 extending downwardly from the spindle top for a certain distance. The spindle is provided with a central bore of reduced diameter 238 which communicates with bore 238, and passed through said bore is a plunger rod 240. One end of said rod carries a cap 241, and surrounding the hub or sleeve portion 222 with one end received in said cap 241, and the other end engaging the convex surface of part 221, is a coiled spring 242, which normally urges the plunger rod to move in one direction, to-wit, downwardly. The opposite end of said plunger rod is secured to what is known as a "spindle cup" 243. This cup has a circular side wall 244 and an end wall 245, to which end wall is secured the plunger rod 240. The outermost end of said cup is provided with a diametric piece 246, which extends beyond the periphery of said cup and is received within the diametric slot 237 of the spindle. This prevents any rotation of the spindle cup 243 relative to the spindle. The spindle cup is provided with a pair of diametrically disposed slots 247, which extend downwardly from part 246. It is also provided with a pair of elongated and diametrically disposed slots 248 disposed 90 degrees to the slots 247.

A pair of clamp dogs 249 and 250 are mounted on a pin 251, which extends transversely between the slots 248 with the outer ends of the dogs adapted to project through the short length slots 247. Both dogs are provided with curved backs 252 for engagement with part 246, and said dogs have edge portions 253, which are adapted to engage the internal flange 105 of the sprocket 98 when the spindle cup is moved in one direction, as illustrated, for instance, in Figure 6. To complete the structure, the outermost end of the spindle portion 236 is provided with a plug 254.

Briefly, and for the purpose of understanding the foregoing construction, when the motor 151 is rotating shaft 171, the worm 199 drives gear 198, which gear turns spindle 196, which spindle is directly connected to the spider 204, the spider driving the filter ring through the filter blocks 208, and the filter ring, in turn, through the filter pads 218, rotating the fly wheel. Thus, all vibration between the rotating parts is eliminated and ease of rotation is assured. The fly wheel, in turn, rotates spindle 227 and when the clamping dogs are in the position shown in Figure 6, with the record released from clamp engagement with its case, the clamp dogs hold the sprocket to the spindle flange, and the diametrically disposed pins or teeth 107 and 108 engage the crown teeth 235 of the spindle flange; thus, the record is rotated. The clamp dogs are held in the position shown in Figure 6 by the part 246. This part engages the curved backs 252 of the dogs, and urges the dogs to swing and separate, or from the solid line position of Figure 8 to the dotted line position, and as the spindle cup moves downwardly, the pin 251 which carries the dogs and is received within the diametric slots 248, moves upwardly within said slots. The dogs are normally urged to the full line position of Figure 6 by the coil spring 241.

Carried by the sub-plate 141 and within the the cabinet 1, is a casing or housing 255 (Figure 9). This housing supports a socket 256. This socket is adapted to receive a pre-focused incandescent bulb 257, which bulb is surrounded by a shield 258. The shield carries a reflector 259 and both the shield and the housing support a mount 260 for condenser lenses 261 and 262. It will be noted that the axis of the reflector is in alignment with the axes of the lenses. The cover 10 overlies the housing and the lamp. This cover is provided with the usual louvers 263 for the escape of heated air. Likewise confined within the cabinet and secured to the sub-plate is a blower 264. This blower is conventional in form and has rubber mounts between the casing thereof and the sub-plate, as shown at 265; the outlet of the blower directly communicates with the interior of the housing 255 for the purpose of cooling the interior of said housing and removing heat therefrom through the louvers 263.

It will be observed that the axes of the lenses 261 and 262 are above the top plate and that a pencil of light, indicated by line 266, passes through said lenses and outwardly from the housing through an opening 267 formed in that portion of the top plate which supports the cover 10 and through an aperture or opening 268 (see Figure 47) in the rim flange 13 and through the apertures 77 and 78 of the gate. All apertures aforesaid are in axial alignment. Within the cabinet and shiftably depending from the top plate is a tubular housing 269, which is provided at one end with a flange 270 (Figure 11). The top plate is formed with an opening 271 (Figure 11), and a mount 272 for projection lenses is confined by the housing. In particular, this amount includes projection lenses 273 and 274, the axes of the lenses being at right angles, there being an interposed right-angled prism 275 for turning the light pencil. The housing carries a spring-pressed detent 276 adapted to engage a notch 277 when the mount is received within the housing. The lens 273 faces the aperture 78 when the axis of the lens is in axial alignment with the condenser lenses 261 and 262. That portion of the mount 272 which is above the top plate 140 and carries the projection lens 273 is passed through the slot 93 in the base 12 of case 11 when the case overlies the top plate 140. I have indicated by dotted lines in Figure 9 a device 278 for projecting the light pencil at different angularities. This device includes a ring 279 which may engage the outermost end of the housing or barrel 269, which ring carries a pair of diametrically disposed and depending arms 280 and 281, between which arms is swingingly mounted a reflector 282, such as a plane-surfaced mirror. Obviously, tipping the mirror will direct the light pencil at different angularities relative to the initial light pencil 266.

Reference is made to Figure 5. A pair of parallel supports and guides 283 and 284 are provided, which guides support parallel sides of the flange 270. These guides and supports are carried by the sub-plate 141. Flange 270 (Figures 5 and 11) is provided with an ear 285, and one end of an arm 286 is pinned thereto. Arm 286 is integrally formed with a further arm 287, the arms being in substantially right angular relationship and arm 287 is provided with an elongated slot 288, there being means 289 passed through said slots and carried by the sub-plate for supporting both arms. The extremity of arm 287 is enlarged at 290 and provided with an oval shaped slot 291. A cam 292 is positioned in said slot, the cam being mounted on shaft 293 which projects through the top of the cabinet. This shaft carries a handle 294 (Figure 4), whereby the shaft may be rotated to turn the cam and move the arms forwardly or backwardly to cause movement of the tubular housing 269 within the guides 283 and 284. This permits a lateral adjustment of the emergent light pencil.

The combined shutter and film movement mechanism is illustrated in detail in Figures 30 and 31. This mechanism includes a shutter disc 295 mounted on one of the sections of the shaft 171. The shutter is positioned between the lamp casing or housing 255 and is received within the cover 10 forwardly of the condenser lens 262 (see Figure 30). The sectors 296 (Figure 31), of which there are three in the present embodiment, cut the pencil of light 266. Carried on the shaft 171 and on one side of the shutter is a cam 297 (Figure 32), forming a part of the means for actuating the film-movement mechanism.

As shown in Figures 30 and 31, a section of shaft 171 is supported by a bracket, designated generally as 298. This bracket has a top wall 299 provided with an end flange or wall 300, and a pair of side flanges or walls 201 and 302. Side wall 301 has a depending portion 303. Attached to wall 300 is an angle arm 304, which arm has a part which underlies the sub-plate 141 and provided with a bore 305. An eccentric 306 is positioned within the bore 305, which eccentric is adapted to be turned by a head 307, provided with a kerf. Turning the head will move the arm forwardly or backwardly to, in turn, produce movement of the bracket 298. The bracket is supported by the sub-plate, the said top 299 being provided with a pair of spaced, substantially parallel, elongated slots 308, through which are passed spaced pairs of screws 309, the screws carrying the usual nuts 310. This arrangement allows a shifting back and forth of the shutter and its line of cutting of the pencil of light 266, and such shifting also permits adjustment of the film movement mechanism, to be described.

As shown in Figure 30, one of the shaft sections passes through suitable bearings in the flanges or sides 301 and 302. That portion of the shaft interposed between the sides 301 and 302 carries a governor 311. This governor is of conventional form, and includes a yoke 312 locked to the shaft, and a cone 313 longitudinally movable on the shaft, with the usual jointed and centrally weighted pairs of arms 314 and 315 positioned between the yoke and the cone. This governor does not regulate the speed of rotation of the shaft but is utilized in conjunction with what is termed a "fire screen" 316.

The fire screen (Figure 31) is carried by an arm 317, and the arm is bent and offset, as shown at 318 and 319, the end of said arm opposite the fire screen carrying a conical roller 320, adapted to have engagement with the lateral surface of the cone 313. This arm is pivoted at 321 to the end wall 322 of the bracket 298. It is intended that the fire screen should cover the apertures when the shaft 171 is not rotating. However, as the shaft rotates, the weighted governor moves so that the conical roller 320 moves along the lateral surface of the cone 313 toward the apex thereof, thus permitting the arm to swing from in front of the apertures.

A bracket 323 (Figures 5, 31, 34 and 35), having elongated portion 324 and a pair of parallel arms 325 and 326, is mounted on the portion 303, the part 324 provided with an extension 327, which extension parallels the portion 303. This bracket is secured to portion 323 by means of a bolt 328. A second bracket 329 has an elongated part 330, and a pair of angularly disposed arms 331 and 332, the arms being adjacent the inner surfaces of the arms 325 and 326. A shaft 333 extends through the arms of the two brackets, the bracket 329 being rockable upon said shaft. The elongated part 330 of bracket 329 is provided along its top edge with a pair of ears, to which are pivoted, as at 334 and 335, a pair of arms 336 and 337, known as the "claw arms", and pivoted between said arms and the upper extremities thereof, at 338 and 339, is a claw, designated generally as 340. The claw (Figures 36 and 37) includes a part 341 which extends between the two arms 336 and 337 and is pivoted thereto in such a manner as to allow a swinging of the arms. The part 341 is provided with an extended portion 342 and a part at right angles to said portion and which forms the claw proper, being provided with three spaced teeth, as shown at 343.

It is apparent from the description so far given that the arms 336 and 337 will have parallel swinging movement. This gives the claw a straight-line movement in its engagement with the film perforations, as hereinafter set forth.

A spring 344 is coiled about a screw 345 carried by bracket 329, an extension 346 of said spring engaging an edge of the portion 330, while an opposite extension 347 of said spring carries a roller 348 adapted to engage one edge of arm 336. Thus, the spring normally urges the arms and the claw to move in one direction, as shown in Figure 36.

The cam 297 is in the form of a disc, the rim of which is provided with an edge cam groove 349 and the inner surface of which is provided with a groove 350 or what is known as a face cam. An extended arm 351 is formed on arm 331 of the bracket 329, the arm carrying a roller 352 received within the edge cam slot 349. A spring is coiled about one end of the shaft 333 at 353, an extension of said spring 354 carrying a roller 355, which engages an edge of said arm 351, while an opposite extension from the coil of said spring overlies the bracket arm 326. Thus, the roller 352 constantly follows the edge cam groove to cause a back-and-forth movement or a lateral movement of the claw. As the claw may need adjustment as to height, the part 303 is provided with a longitudinal slot 356 (Figure 34), through which is passed a shoulder rivet 357 carried by the part 327, while the bolt and nut shown at 328 (Figure 31), is capable of being tightened or loosened so as to permit movement between the portions 303 and 327.

Referring back to Figures 30 and 31, inclusive, the arrangement of the parts is such that the claw, and specifically the teeth 343, may pass through a slot 358 in the top plate at one side of the aperture 267. It is to be observed that the rim flange 13 of the case is cut away or slotted at 81 and has two slots, one of which, 81A, is in alignment with the slots 358 (see Figure 48). The slots 79 and 80 (Figure 51), of the gate are in alignment with slots 358, 80 and 81A. Hence, the toothed end of the claw may move from the position shown in Figure 32 to that shown in Figure 30, to engage perforations of the film.

The tone arm 3 and its mechanism for raising and swinging the same into initial playing position and thereafter, after the record has been played, lifting the arm and swinging the same into a neutral position, will be described. The tone arm may be of any form desired, with any type of pick-up, such as a crystal pick-up actuated by a permanent needle in the tone arm head. As is usual in tone arm construction, the arm is fashioned from sheet metal, or may be a casting, having a top wall 359 and side walls or flanges 360 for strengthening the same. In the present instance, there is provided a bracket 361 which has two parallel leg portions 362 and 363 and interconnecting portion 364, the leg 362 being positioned adjacent and anchored against rotation to the sub-plate 141, and particularly at the zone of a depressed portion 365 of said plate. The top plate has a raised portion 366 which overlies the depressed portion 365 and is formed with an opening 367 through which the wall of the tone arm passes. The tone arm is adapted to swivel and is limited as to movement in one direction by a flange 368 carried by said arm (see Figure 16). A shaft 369 is passed through the legs 362 and 363, the shaft carrying on its upper end a rubber grommet 370 which is connected through a bracket 371 with a swivel 372. This swivel comprises a pair of arms pivoted to sides of the tone arm as, for instance, shown at 373. Thus, the tone arm may tip relative to the swivel. This swivel straddles the shaft 369.

Surrounding shaft 369 are bearing type collars 374 and 375. Both ends of the collar 375 are threaded, the upper end adapted to receive a nut portion 376 of the collar 374. A nut 377 is threaded upon the lower end of collar 375. Thus, the bearings are held in cooperative relationship and in a manner to permit the securing together of various members to be described. A flanged bushing 378 surrounds collar 375 and an arm 379 is swingingly carried on the bushing. This arm connects with a link 380, the purpose of which is to be described. Also carried by the bushing and rotatable thereon is a quadrant plate 381; this quadrant plate carries a depending cup 382 adapted to house a plunger type detent 383 urged outwardly from the base of said cup by a coiled spring 384 within the cup. The quadrant is provided with a dependent lug 385 which functions as a stop member for swing movement of the quadrant in one direction, as detailed in the statement of operation, and the said quadrant has a depending member at 386 functioning as a stop member for swing movement of the quadrant when it moves in a second direction. Carried by the shaft 369 is an arm 387. This arm is provided with a hub 388 which may be locked against rotation to the shaft 369 by any suitable means, such as by a set screw 389. Said arm is provided with a depending lug 390 which functions as a stop member, and said arm 387 is formed with a notch or depression 391 which cooperates with the detent during certain swinging movement of the quadrant plate and the arm.

The leg 362 of bracket 361 is carried on collar 375 between bushing 378 and the sub-base portion 365. Bracket 361 carries a member 392 adapted to receive a set screw 393, the screw acting as an adjustment means to limit the swing of the arm 379 in one direction, it being observed that said arm has an extended portion 394 provided with an angular stop 395 for contact with said adjusting screw. Arm 379 carries at one edge a depending lug 396 and plate 381 is provided with a lug 397, and the ends are interconnected by a coiled spring 398. The shaft 369 carries a collar 399 which is secured thereto by set screw 400. The collar limits movement of the shaft in one direction when said collar contacts leg 363. A tone arm lever 401 has one end positioned beneath the lever 387 in the zone of the hub 388.

I provide a leverage system which, when actuated through the lever control 9, will raise the tone arm from a neutral or non-playing position and position it over and onto the record on some one of the inside starting grooves thereof, and which leverage system will act to lock the case 11 in a defined position upon the top plate 140 of the cabinet and, at the same time, release the record for rotation by the record spindle. This leverage system is shown in Figures 12 to 15, inclusive. The shaft for control lever 9 projects through the top plate and the sub-plate and carries within the casing or cabinet a pinion 402. This pinion meshes with the teeth of a segmental gear 403, known as the "locking gear." A lock-down lever 404 is connected through link 405 to gear 403.

Referring to Figure 9, lever 404 is adapted to actuate lock-down means which secures the record case against movement and in pressure engagement with the top plate 140. This mechanism, which is common for other spaced points, includes a member 406, having three bores of different diameter, as shown at 407, 408, 409, all bores being on the same axis. A stem 410 passes through bores 408 and 409 and carries a plunger 411, there being a coiled spring 412 surrounding the stem 410 and positioned within the bore 408, normally urging the plunger in one direction. The member 406 is rotatable within bores of the top plate and the sub-plate. Any suitable means is provided, as between the sub-plate and lever 404, to provide a bearing and likewise suitable means for holding the member in position of service, such as the split washer shown in said figure. The upper end of member 406 carries a pair of diametrically positioned and radially extending pins 413 and 414. These pins, when properly positioned, are readily passed through the diametric ways 33 in the case (see Figures 39 to 42), and when the member 406 is rotated, the pins will ride upon face cams 31 and 32. There are three lock-down members for the case, all having the construction illustrated in Figure 9. In the case of the lock-down member shown in Figure 40, the member 406 thereof carries beneath the sub-plate, a bell crank 415. A link 416 interconnects the bell crank with the locking gear 403. This bell crank is provided with a face cam 417. A further lock-down is provided, as shown in Figure 41, the member 406 of which is secured to bell crank 418. A link 419 interconnects bell crank 415 and 418. The bell crank 418 is provided with a face cam 420. The link 380, heretofore referred to, is pivotally connected to the bell crank 418, and the lever 401 is pivoted to a bracket support 421, one end of said lever formed with a part 422 for engagement with the face cam 420. The bracket support 421 is fastened to the sub-plate. The cam 417 is adapted to actuate a lever for releasing the spindle for engagement with the sprocket, as see Figure 6. This lever actuates plunger rod 240.

A bracket 423 is secured to and depends from the sub-plate, and pivoted at 424 to said bracket is a lever 425. A spring 426 extends between the bracket and the lever below the pivot 424 and normally swings the lever downwardly, or to the position shown in Figure 6. One end 427 of the lever is positioned beneath the lowermost end of the plunger rod 240. The opposite end 428 of said lever is adapted to engage the face cam 417 of bell crank 415. It is evident that, as the end 428 of said lever rides upon the cam to swing the lever on its pivot, end 427 will contact an end of the plunger rod 240 and lift the same upwardly to compress spring 242 and move the clamp dogs from the dotted-line position of Figure 8 to the full-line position of said figure. Pivoted to the said plate at 429 is a lever 430, known as the "locator lever," this lever being in the form of a bell crank, one portion 431 adapted to have engagement with an edge of the bell crank 415, while the opposite portion 432 carries a block 433. This block is adapted for movement in an elongated slot 434 in the top and sub-plates. The base 12 of the case 11 is provided with a matching slot which is adapted to overlie the slot 434, as shown in Figure 4 at 435. The block 433 extends through the slot 434 and is adapted to engage an edge 436 for urging the case in one direction. Thus, as will hereinafter appear in the statement of operation, the block acts to position the gate properly with relation to the projection apparatus. A coil spring 437 is secured between the lever 432 and a pin carried by the sub-plate. The spring normally urges the block 433 in one direction. However, a turning of the bell crank 415 in one direction will effect engagement with the end 431 and revolve the bell crank 430 about its pivot point 429 in such a manner as to move the block 433 within the slot 434 and tension the spring 437.

What is known as the "resynchronization means" is illustrated in Figures 5, 12, 13 and Figures 26 to 29, inclusive, reference being had to these figures. Carried on the shaft 171 and external cover 175 is a gear 438. This gear carries a disc 439 provided with a claw 440. Included between the rim of the disc and the room diameter of the gear 438 is a leaf spring 441. This leaf spring is pinned or otherwise secured to the gear as shown at 442, and said spring has an outwardly bowed portion 443, the end of which terminates adjacent the claw 440 of the disc 439.

Secured to the casing 152 of the motor and projecting outwardly therefrom is a stud shaft 444, see Figure 28. This shaft carries a sprocket 445 which is spaced from the motor casing by means of a collar 446, the said sprocket provided with an exteded hub 447. This hub is shouldered at 448 and carries on the shouldered portion, gear 449. The relationship is such that rotation of the sprocket produces rotation of the gear 449. Likewise carried on the shaft 444 and forwardly of the gear 449 is an arm 450, the arm having an offset portion so as to space the outer end 451 from the gear 449. The outer end of the arm carries a pinion 452 mounted on a stud shaft 453, and the outer end of said arm is provided with a claw 454 which at times cooperates with the claw 440 of the disc 439.

The gear 438 has a mutilated tooth portion 455, and dependent upon swing of the arm 451, the pinion 452 is brought into engagement with the teeth of gear 438 to rotate the same until the pinion reaches the mutilated portion 455 at which time rotation of gear 438 ceases. In other words, viewing Figure 26, the pinion has reached the mutilated portion 455. When this portion is reached, the pinion may rotate without producing any rotation of the gear 438. At this time the claw of the arm 450 will contact claw 440 and prevent further rotation of the gear. It may be mentioned that the claw 454 moves over the outwardly bowed portion 443 of the spring 441 to permit the claw end 454 to snap into the space included between the end of said spring and the claw 440. Referring to Figure 12, the tone arm link 419 is provided along one edge thereof with a rack 456. The pinion 457 meshes with the teeth of the rack, this pinion is mounted upon a shaft 458 carried by a bracket 459, the bracket being secured to the sub-plate 141. The opposite end of the shaft carries sprocket 460 and a continuous chain 461 extends between the sprockets 445 and 460.

It will be observed that pinion 457 is of extended length and is made in this manner so that the rack teeth will at all times engage the teeth of the pinion when the link 419 is shifted laterally upon movement of the bell cranks 415 and 418. The arm 450 is in the form of a bell crank in that it is provided with a second arm portion at 462 which is offset at 463 so as to bring a portion of this arm into close proximity to the cover 175. The cover carries a pin at 464 so as to limit downward movement of arm 462. A coil spring 465 is secured between a pin 466 carried by the casing of the motor and the outer end of the lever 462. This spring normally causes the arms to move clockwise about the pivot point, to-wit: the stud shaft 444. The gear 449 is provided with a pin 467 which at times cooperates with a right-angled lug 468 carried by arm 450.

To give a brief indication of the purpose of this mechanism, reference is made to Figure 29 which illustrates the position of the parts after the record has completed its play and the machine has stopped operation, and the machine as a whole—to wit: the record and the picture film—is to be synchronized, while Figure 26 shows the position of the parts when the record and the film have been resynchronized.

As will be pointed out in the statement of operations, it is essential that each case 11 with its overlying or covering sound record must have its gate portion correctly positioned relative to the film movement mechanism, the source of light and the condenser lenses. To do this, it is to be observed that the case has portions for receiving the spring-pressed plungers 410, and that the spring-pressed plungers are spaced apart. This provides a means whereby the operator may correctly position the case over the top plate, see particularly Figure 4.

When the case is correctly positioned with the spindle 227 passed therethrough and through the record, the spring-pressed plungers 410 will balance the case, that is to say, elevate it slightly above the top plate 140. This balance assures that the case will be brought into even engagement with the top plate, through mechanism to be described, when the lever 9 is rotated. However, the case must be properly positioned, and to assure the correct position, the spring-pressed block 433 (see Figure 9) engages the record case at the edge 436 and under urgency of the spring pushes the case in one direction, to-wit: moves the gate portion toward the condenser lenses.

Referring to Figures 47 to 55 inclusive, the top plate 140 adjacent the lamp housing and spacedly positioned on opposite sides of the aperture 367 is provided with bosses 469 and 470 which enter the slot 81 of the casing to bring said bosses adjacent the gate and particularly the member 75 thereof, see Figure 47. In such position, the base portions of the gate rest upon what are termed "gate bosses" 471 and 472, these latter bosses being extensions of the bosses 469 and 470, see Figure 53.

When the case is locked against the top plate, the record is released for rotation upon movement of the ring 19 in an upward direction. The sequence of movement is illustrated in Figures 40 and 41. In Figure 40 the spring-pressed plungers are balancing the record case and the record above the top plate, the record being clamped between the ring flange and the flange of the case, whereas in Figure 41 the case is locked down and the ring is elevated, the record being released.

In considering the picture record, the strip film has a definite number of frames which is a multiple of the intervals on the sound record. We have arbitrarily assumed that 24 frames will pass the gate aperture per one revolution of the record. In other words, 15 degrees of rotation of the record equals one frame. Therefore, in considering the length of the continuous strip film, the total number of frames is equal to a multiple of the number of frames passing the aperture during one revolution of the record. If, for example, the endless or continuous strip film is 120 feet in length, there are 9,600 frames. As this number is divisible by 24, the machine will operate correctly. If the number of frames is not divisible by 24, then sufficient frames on a leader strip must be added so as to make the total number of frames divisible by 24. This requirement must be maintained, otherwise the synchronizing apparatus will not operate properly.

The operation, uses and advantages of the invention just described are as follows:

Ordinarily, the record is of the 12-inch diameter type, although it is apparent that it may be of any diameter and the recording groove, may take the form of either a lateral cut or a hill-and-dale, the character of the recording, whether it be music, dialogue or otherwise, bearing a definite relationship to the picture to be projected. The record groove commences at the inside of the record, that is, toward the center opening of the record, which normally receives the spindle.

Referring to Figure 1, the record groove commences with two spiral grooves 473 and 474, which grooves merge with the record playing groove 475. These spiral grooves are, of course, spaced-apart at the commencement, with the result that when the tone arm has its needle placed within, at one side of, or between the spiral grooves 473 and 474, the needle will automatically move into one of the grooves and upon one or more revolutions of the record, will bring the needle into the playing groove.

In one adaptation of the record groove, the record will perhaps rotate three times before the needle is brought into the playing groove. This, of course, depends upon the position of the tone arm, and such initial spiral grooves function with the synchronizing apparatus to at all times assure that the sound on the record and the picture on the film are synchronized.

As was pointed out in the statement of the objects of the invention, the film must, at all times, have a loop on either side of the gate. I have found that unless the film is properly synchronized with the sound, that the strip film will gradually lose its loop and, in some cases, the film is broken. It, therefore, becomes important where different combinations of sound and film are to be played upon the same instrument that all of said records, with their picture accompaniment, be assured of synchronization. It is evident that if a single record, with its continuous strip film, was to be constantly played upon the same machine and never removed therefrom, that synchronization might at all times remain perfect. This is not the case, however, when the record, with its case, is removed and a new record and its case is applied to the machine. The present invention assures a proper playing of both the record and the projection of the film at all times.

Initially, I wish to point out that I have arbitrarily selected in the practice of the present invention, 8 millimeter strip film of the continuous type, and wherein 16 frames pass the gate aperture per second. Furthermore, the record is to be rotated at 40 revolutions per minute, to the end that 24 frames of the film move past the gate aperture to each revolution of the record. Accordingly, I have divided the record into 24 parts or divisions, and hence the slots 138 in the record (see Figures 9 and 10) total 24, and the number of crown teeth 235 on spindle 227 total 24.

I have so related the gear ratios with relation to rotation of the main shaft of the motor that when the motor shaft rotates 960 revolutions per minute, the spindle 227 turns at 40 revolutions per minute. This drive from the main motor shaft 167 is through the pinion and gear 169 and 170 to rotate shaft 171. The mounting for the fly-wheel 224, which is keyed to the spindle 227, is such that vibration is reduced to a minimum, for the reason that the drive between the spindle 196 and the fly-wheel is through filters. Furthermore, the connection with the sub-plate which supports this mechanism is through rubber mounts. Vibration of moving parts is, therefore, reduced to a minimum and said vibration is not picked up and amplified by the loud speaker system, which is used in devices of this character. In other words, the tone arm may have a crystal pick-up and impulses are directed through an amplification-audio system which leads to a loud speaker.

To best explain the operation, I will assume that the cabinet 1 is free of a case and its record, and it is desired to place a combination film and record on the spindle of the cabinet.

The record 21 and its case will be so related that the record will be clamped between the flange 20 of ring 19 and the flanges 14 and 15 of the case 11. The record will be in a definite position and so held due to entrance of pin 137 within one of the slots 138, see Figures 9 and 10. Thus, any unauthorized tampering with the idea of rotating the record is effectively prevented. The clamping relationship which exists between the ring and the case is maintained by the means illustrated in Figures 39 to 46 inclusive for the reason that slides 18 have been moved through the instrumentality of the spring links 49 and the lever 39 to position the ring with relation to the flange of the case in the position shown in Figure 45. In other words, the pins 24 and 25 are at the bottom inclined slot 16 and likewise at the bottom of the vertical slots 22 and 23 of the slide. The position of the parts will appear as in Figure 4, wherein it will be observed that the lever 39 has a toggle connection with the link 49. This toggle relationship serves as a lock for the lever and the link in each instance, and assures that the ring and the case so cooperate as to clamp the record therebetween.

The continuous film will appear within the case as illustrated in Figure 4. If now we place the combination case and its record on the spindle 227 in what may be termed a correct position, that is, with the gate portion of the case facing the lamp housing, the spring plungers 410 of the cabinet will enter the means 28, the plunger contacting top 36. As there are three of the means 28 unequally spaced apart, it is easy to determine from the unequal spacing the proper position for the case. The plungers will balance the case with its record so that the case may be correctly locked and the record released for rotation.

Referring to Figure 4, the case and its record in said figure is assumed to be unlocked. However, the case is floating or carried by the spring plungers. The tone arm is at one side of the record and its case. The operator moves the lever 9 from the full-line position of Figure 4 in the direction of the arrows to the dotted-line position, which indicates a locked position for the case. Movement of the lever 9 from the solid-line position of Figure 4 to the dotted-line position results in a series of operations within the cabinet and likewise within the record case.

First, the transverse pins 413 and 414 initially enter the diametric way 33, whereupon rotation of lever 9 produces rotation of pinion 402, gear 403, and movement of the links 405, 416 and 419. Such link movement rotates members 406 and the associated pins 413 and 414 to cause said pins to travel upwardly upon the face cams 31 and 32, which forces the case against the top plate, at the same time rotating member 34, producing simultaneous rotation of the lever 39, moving the link 49 and actuating slide 18. Actuation of the slide, as before stated, moves the ring 19 from clamping engagement with the record and from the position of Figure 39 to that of Figure 41. In this latter figure, it will be observed that the record is free, while the case is held against the top plate of the cabinet. It will also be observed that the plunger stem has moved downwardly and that the spring 412 is compressed.

When the case and the record are in the position shown in Figures 1, 2 and 3, the lever 9 has been moved to the dotted-line position of Figure 4 and the linkage with its several associated parts is in the position shown in Figure 12. Prior to any lock-down of the case, the locator lever 430 moves the block 433 into engagement with the record case, as illustrated in Figure 9, to move the case toward the lamp housing and particularly to bring the centering bosses 469 and 470 into contact with the gate and position the gate on the gate bosses 471 and 472. The lens mount 272, Fig. 11, is received in part within the case through a slot 93 in said case, as shown in Figure 9. The projection lenses of said mount are in axial alignment with the axis of the condenser lenses 261, 262, and likewise correctly positioned relative to the apertures 77 and 78 of the gate and with the opening 268 of the lamp housing.

After the handle 9 has been rotated to the dotted-line position shown in Figure 4, the pins 413 and 414 will be at right angles to the way 33, in Figs. 39 to 42, inclusive. The members 406 rotate 90 degrees while the lever 9 is rotating 270 degrees. A member 406 of the lock-down means is connected in one instance to the lever 404 and in other instances to the bell cranks 415 and 418. A swinging movement or rotation of the bell cranks will, in each instance, rotate the members 406, 90 degrees. When the linkage and the bell cranks are in the position shown in Figure 12, the record is ready to play and the end 428 of the lever 425 has moved from the position shown in Figure 14—that is, from the raised portion on the cam—to a position where it overlies the bell crank surface. Such movement will permit the spring 242 to expand and move the stem 240 downwardly, the lever end 427 assuming a spaced relationship with the end 240 of said stem, as illustrated in Figure 6. When the record and its case is first placed on spindle 227, the clamp dogs 249 and 250 are in the position shown in Figure 8, that is to say, said clamp dogs are raised and positioned within the confines of the diametric slots 237. This occurs for the reason that when the plunger rod or stem 240 is raised, the spindle cup 253 is moved within the base 238 of the spindle 227 and the clamp dogs are revolved on pin 251. The circular side wall 247 has slots 247 through which the clamp dogs project, and the lower edge of said curved side wall 244 bounding the slots will contact the clamp dogs and swing them inwardly of the cup in the manner shown in Figure 8. On the other hand, when the end 428 of lever 425 moves from the cam 417, the plunger rod 240 will move downwardly under action of the spring 242, and the diametric piece 246 of said spindle cup will force the clamp dogs outwardly through the slots 237 to cause engagement of said clamp dogs with the internal flange 105 of sprocket 98. As shown, in Figures 6 and 8, the pin 251 moves within the elongated diametric slots 248, during outward and inward swinging movement of the clamp dogs. When the clamp dogs engage the internal annular flange 105, the diametric pins, teeth or lugs 107 and 108 carried by the sprocket member 98 engage a certain diametric pair of the crown teeth 235 of the spindle member 227. In this manner, the record is locked to the spindle for rotation, it being observed that the spindle 227, when rotated, likewise rotates the flange 230, the plunger rod 240, the clamp dogs and the sprocket. As before stated, the sprocket 98 is carried by the record and is at all times confined within the case 11.

At the beginning of the movement of handle or lever 9, end 422 of lever 401 is within a notched portion 476 of cam 420, see Figure 13. When the lever end 422 is in this location, the tone arm 3 is in the non-playing position illustrated in Figure 4. However, when the lever 9 is moved from the full-line position of Figure 4, a slight amount, end 422 of said lever escapes from the notch or depression 476 and the tone arm will move from the upwardly tipped position of Figure 16 to the position shown in Figure 17, which is the released or playing position for said tone arm. Reference is made to Figures 16 to 19 inclusive, which shows that the innermost end of the lever 401 engages the underside of the arm 387 adjacent the hub 388. It is evident, then, that to move the lever 401 so as to raise the shaft 369, the end 422, Fig. 13, must engage the cam 420, and that to lower the shaft 369, the end 422 must move from the cam surface. However, when the tone arm is tipped upwardly to the position of Figure 16, the initial movement of part 422 from the notch 476 will bring the flange 368 into engagement with member 366 to cause the tone arm to swing on its pivots 373. When the tone arm 3 is in a neutral position (the position shown in Fig. 4), it is supported by a post carried by the top plate of the cabinet, and when it is desired to play the record, the tone arm is first tipped upwardly a slight amount so that it will clear the post, whereupon the tone arm is moved to a position where the needle may engage one of of the spiral grooves 473, 474. The means just described raises the tone arm, that is, through the instrumentality of the lever 401 cooperating with the cam 420. To swing the tone arm from the neutral position illustrated in Figure 4 to a playing position, as, for instance, shown in the full lines of Figure 1, the link 380 upon movement will rotate the shaft 369. As shown in Figures 16 to 19 inclusive, the link 380 is pinned to the bell crank 418 and to the lever 379. This lever 379 is held against the quadrant 381 by the lock means 377 so that movement of the lever will produce movement of the quadrant. The arm 387 is held by the set screw 389 to the shaft 369 and when the plunger or detent 383 is within the depression 391 of the lever 387, any movement of the link 380 will produce rotation of the shaft 369. There may be relative rotation between the arm 319 and the quadrant 381 as the drive therebetween is controlled by the tension spring 398. Thus assuming the parts in the position shown in Figure 16, rotation of the lever 379 will cause rotation of quadrant 381 through the spring connection 398 therebetween. As the shaft 369 is lowered resultant upon the end 422 of lever 401 moving from the raised cam surface, the tone arm is swung from the position shown in Figure 4 to the full-line position of Figure 1, the detent 383 escaping from the depression 391. At this time, the shaft 369 is freed, as is likewise the tone arm, so that the tone arm may follow one of the spiral grooves 473, 474, onto the main groove, which permits playing. This constitutes the first operation for the mechanism and prior to energizing the motor and starting film and record movement.

Figure 56 shows a wiring diagram which may be utilized in the practice of the invention. Thus, I have a pair of leads 477 and 478 in circuit with a source of power, the lead 478 being in circuit with a lamp 257 and motor 151. Lead 477 is in circuit with lamp 257 and with a relay 479, the winding of which leads to push button 8; the other lead from the push button connects with microswitch 124 and the armature of said relay, the armature in turn being in circuit with the motor 151. There is a light control switch at 480. When the microswitch is in the position shown in this diagram, current to the motor is broken. However, when the push button 8 is depressed, current flows through the lines 477 and 478 to actuate the relay to complete the circuit to the motor and upon closing switch 480, circuit is likewise completed to the lamp 257. The energizing of the motor will rotate the spindle 227 to in turn rotate the record, and rotation of the spindle will cause simultaneous rotation of the sprocket 98 to produce film movement, see Figure 4. The direction of film movement is that indicated by the arrow 480ª. This film is moved past the gate by the mechanism illustrated in Figures 33 to 37. The arms 336 and 337 are of the same length and are parallel with the result that the claw 340 has a straight-line swing. The claw head or tooth end thereof shown at 343 is oscillated by means of the grooved cam 350, the arm 336 carrying a roller received within said grooved cam, while said arms are tipped forwardly and backwardly by the edge cam 349. It is to be observed that the roller 352 enters the edge cam and that the roller is carried by an arm 351 for tipping the bracket 329. Thus, the claw teeth 343 are brought into position so as to pass through the slots 79 and 80 of the gate to engage the perforations of the film and to advance said film in its movement.

The means shown in Figure 34 may be utilized for adjusting the height of the claw so that it will enter the slots of the gate properly. To correctly position the claws for transverse movement within the gate slots, adjustment is afforded by rotation of the eccentric 306 within the bore 305 to shift the bracket 298, see Figures 5, 30 and 31. The shutter 295 will be rotated as it is mounted on the shaft 171, and the fire screen 316 will uncover the aperture as the governor 311 moves the cone away from the conical roller 320 to permit the fire screen arm 317 to revolve or turn on its pivot.

As the record and the film are in synchronism, that is, the sound matches the picture on the film as to sequence, the synchronizing mechanism shown in Figures 26 to 29 inclusive, has not been brought into operation. Thus, when arm 9 is rotated to effect a lock-down of the case and to permit rotation of the record, the linkage and its associated members will assume the position shown in Figure 12, which is known as the playing position. It will be observed that the pinion 457 is adjacent one end of the rack 456, having moved to this position when the link is moved in the direction of the arrow on said figure. Such movement rotates the sprocket 460, causes rotation of the continuous chain 461, revolving the sprocket 445, producing rotation of gear 449, and likewise rotation of pinion 452.

Stop pin 467 is on one side of the lug 468 of arm 450. The position is such that the spring 465 may revolve the claw end toward the stop claw 440 of the disc 439. If Figure 26 represents the position of the parts at the commencement of a turning of lever 9 in a counter-clockwise direction to lock the record case against the top plate of the cabinet, revolution of the gear 449 will not disturb the arm 450 until the stop pin 467 engages the lug 468, as shown in Figure 29, whereupon the stop claws 440 and 454 will separate. Such movement tensions the spring 465. As long as the two claws 440 and 454 co-engage as shown in Figure 26, the shaft 171 is prevented from rotating. Hence, even though push button 8 is closed in the circuit shown in Figure 56 and the motor 151 energized, still the motor will not rotate the shaft until the two claws are separated, and such separation cannot occur until the several parts of the mechanism have been properly actuated—that is to say, until the record case has been properly positioned relative to the apertures and the source of light and locked against movement to the top plate of the cabinet with the tone arm moved from a neutral outside position to an inside playing position and is in actual contact with one of the spiral grooves of the record. Thus, when the record and the film are in synchronization, movement of the rack 456 in a counter-direction to that indicated by the arrow on one side of the link 419, Fig. 12, will produce no rotation of gear 438 as the pinion 452 will be positioned within the mutilated portion 455.

When the playing of the record is completed, the tone arm has moved to the rim of the record and the continuous film has moved through the gate until the microswitch breaks the circuit to the motor. Reference to Figures 52 to 54, inclusive, shows the microswitch operating members and which include the lever 127 having at 129 a film-overlying portion which rides on the film edge during movement thereof until the overlying portion falls within the notch 123 of said film, whereupon the microswitch is opened, Figure 53 illustrating open position. Figure 54 is the closed position.

The light switch 480 may be open, and the operator is unable to remove the record and its case from the spindle until he has moved the lever 9 from the full-line position of Figure 1 to the dotted-line position thereof. When the lever is so moved, the linkage moves the bell cranks 415 and 418 as well as the lever 404 and certain actions occur simultaneously, to-wit: the tone arm is moved from its outermost position onto its supporting post, placing the tone arm in a neutral position; the rack 456 rotates the pinion 457, and in so doing the gear 449 is rotated, causing rotation of pinion 452 and under urgency of the spring 465, brings said pinion into engagement with the teeth of gear 438. Assume that the pinion engages the teeth at 481. This is what is termed an out-of-synchronism position. A continued rotation of the arm 9 will rotate the pinion 457, thus rotating pinion 454, and said pinion will rotate the gear 438 until the pinion 454 is received within the mutilated portion 455, at which time the claw 454 will have passed over the leaf spring 441 and engages the claw 440. This almost complete rotation of gear 438 occurs while the arm or lever 9 makes a three-quarter or 270° rotation. As the gear 438 is in driving relationship with the motor shaft 167 through the gears 169 and 170, it is evident that rotation of gear 438 will rotate not only the motor shaft, but in turn will also rotate shaft 171 and in so doing rotate the shutter and cause movement of the film-movement mechanism, which includes the claw which enters the slots in the gate. Hence, during rotation of gear 438, the film-movement mechanism is operated to produce movement of the film past the gate. As there will always be certain frames of the film bearing definite relationship to certain sounds on the record, when the record with its case is again placed on a spindle and locked down, movement of the arm 9 will always swing the tone arm inwardly to a certain position on one of the spiral record grooves to the end that both sound and picture are in synchronism.

In Figure 38, I have diagrammatically illustrated the movement of the claw for producing film movement through the gate. Upper line 482 illustrates the in-and-out movement of the claw caused by the edged cam, while the line 483 indicates the advance movement of the claw which is controlled by the face cam 350. Starting with what is known as "zero" degree, the first 50 degrees of rotation of the edge cam causes engagement of the claw with the perforations of the film, and the face cam during the first 45 degrees of movement advances the film. From 45 degrees to 135 degrees in movement of the face cam, there is no movement of the claw transversely of the slot and the film remains stationary. However, from 50 degrees to 135 degrees in the rotation of the edge cam, the claw is withdrawn and continues to be withdrawn until the edge cam is rotated 270 degrees. During 135 degrees to 270 degrees of rotation of the face cam, the claw returns to zero position. From 270 degrees to 355 degrees of movement, the edge cam moves the claw into engagement with the perforations of the film followed by a 5° dwell. It will thus be seen that the picture on the film is actually in front of the aperture for 315 degrees of cam movement. So far as the shutter is concerned, there is one revolution of the shutter per frame. The shutter has two interruptions per revolution while the picture is being projected into a screen, and one interruption during film movement.

When the film is in motion, the light is projected through the film onto the mirror 282 and hence either onto a screen which may be on the side of the cabinet, or onto some screen at a distance from the cabinet.

As a recapitulation, during the first ten degrees of movement of the arm 9, the spindle is locked to the record sprocket, the positioner block 433 is released and pushes against the record case to correctly position the aperture with relation to the condenser lenses and locking of the case to the top plate is commenced. Continued movement of the arm causes the stop claw of the resynchronizing mechanism to move from the position shown in Figure 26 to that of Figure 29, during which time the tone arm is lifted from its post and swung over the record to starting position. This movement of the tone arm occurs during the first 50 degrees of movement of the arm 9. The film claw is always left in a film perforation withdrawn position and midway of its movement.

When the tone arm has completed its traverse of the record grooves and has reached the end of the recording, the needle will remain in the groove or on the record until the arm 9 is moved. Movement of the arm 9 will, through the various linkage, rotate the bell crank 418. Such movement turns the lever 401 so as to raise shaft 369. The link 380 will move lever 379 which through the spring connection will cause movement of the quadrant 381. As the plunger 383 has moved from the depression 391 in arm 387, the plunger will not contact the top surface of said arm and move over the same until the plunger is again received in the depression 391, whereupon the tone arm will move the needle from the record. As the shaft has been raised by the cam 420, the tone arm will be tipped to the position shown in Figure 16 until such time as the end 422 of lever 401 is received within the notch 476, whereupon the tone arm is dropped so as to rest upon the supporting post carried by the top plate of the cabinet.

In the resynchronization of the sound record with relation to the film, it is important to remember that the sound record is divided into 24 divisions of 15 degrees each. In the resynchronization, assuming that the starting point is exactly at the zone indicated at 481 in Figure 26, one complete revolution of the gear 438 will produce substantially one complete revolution of the shutter, movement of one frame of the film, and 15 degrees movement of the record. Therefore, it is evident that if, at the completion of the record playing and film stoppage due to opening of the microswitch, said gear 438 has some other teeth presented toward the pinion 452 as, for instance, teeth indicated at 484, then the said gear will be revolved substantially 180 degrees by the pinion 452, and until the pinion reaches the mutilated portion 455. Hence, the shutter would rotate 180 degrees, the record would be rotated 7½ degrees, and the film claw would have moved the film one-half a frame. Such movement, as is obvious, correctly frames the picture and places the picture in synchronism with the sound record, this for the reason that the tone arm is always moved to a defined position relative to the two spiral grooves which lead to the playing groove or sound groove. Hence, the record will always present a definite location for needle contact with the spiral grooves, and when the record revolves the needle will be brought into contact with the sound groove and in synchronism with the picture.

It is important to remember that 270 degrees movement of the lever 9, counter-clockwise, moves the tone arm to playing position, and that the linkage and associated members, such as the bell cranks, are in the position shown in Figure 12. Hence, clockwise movement of lever 9 causes opposite movement of the linkage and associated members and operates the resynchronization mechanism shown in Figures 26 to 29, inclusive.

A feature of importance is that the lever 9 will always move through an arc of 270 degrees. Thus, if the gear teeth at 484 of gear 438 are brought into contact with the pinion 452, this pinion will rotate the gear until the mutilated area is reached and the stop claws 454 and 440 engage. However, the arm 9 may continue to rotate its full 270 degrees, the only result being that the pinion 452 rotates within the mutilated area of gear 438.

I claim:

1. A resynchronizing device for a disc sound record having a spiral sound groove and a continuous film, the frames of which bear a definite relationship to the sound record: a gate provided with an aperture through which gate the continuous film is passed, film-movement means at said gate for advancing the film a frame at a time, a motor drive shaft for rotating the disc record and for actuating the film movement means, a gear on said motor drive shaft having a mutilated area, a second gear, a pinion in mesh with the teeth of the second gear, and means for moving the pinion into engagement with the first-named gear, whereby rotation of the second-named gear will produce rotation of the first-named gear through said pinion until the mutilated area of the first-named gear is reached.

2. A resynchronizing device for a disc sound record having a spiral sound groove and a continuous film, the frames of which bear a definite relationship to the sound record: a gate provided with an aperture through which gate the continuous film is passed, film-movement means at said gate for advancing the film a frame at a time, a motor drive shaft for rotating the disc record and for actuating the film-movement means, a gear on said motor drive shaft having a mutilated area, a second gear, a pinion in mesh with the teeth of the second gear, means for moving the pinion into engagement with the first-named gear, whereby rotation of the second-named gear will produce rotation of the first-named gear through said pinion until the mutilated area of the first-named gear is reached, and means for locking said first-named gear against movement when the mutilated area thereof is reached by the pinion.

3. In combination, a motor, a shaft extending from said motor and adapted to be rotated thereby, a gear provided with a mutilated tooth area rotatably carried on said shaft, film-movement means actuated by rotation of the shaft, a spindle, means between said spindle and shaft for rotating the spindle, a second gear, a pinion in mesh with the teeth of said second gear, means for rotating the second gear to produce rotation of the pinion, the teeth of the pinion adapted to mesh with the teeth of the gear on the motor driven shaft to rotate said gear until the pinion reaches the mutilated area thereof, and means for locking the motor driven shaft against movement when said mutilating area is reached by the pinion.

4. In combination, a case adapted to house a continuous film, a disc record overlying the case, and provided with a sound groove, said case provided with a gate having an aperture, film-movement means for progressively moving the film a frame-at-a-time through said gate and past the gate aperture, means for rotating the record and for actuating the film-movement means, and means for simultaneously rotating the record and for actuating the film movement means after completion of the running of the film and the playing of the record, to position a frame of the film completely within the aperture of the gate.

5. Means for synchronizing a picture record with relation to a sound record upon the completion of the play of the picture record and sound record, including a record having a sound groove, a tone arm provided with a reproducer head having a stylus for play in said sound groove, said picture record comprising a continuous strip film provided with individual frames, a gate provided with an aperture through which said strip film is moved, film movement means at said gate for progressively moving said strip film, means for rotating the record and the film movement means, and means for actuating the film-movement means upon completion of its cycle run to position a complete frame in the aperture.

6. Means for synchronizing a picture record with relation to a sound record upon the completion of the play of the picture record and sound record, including a record having a sound groove, a tone arm provided with a reproducer head having a stylus for play in said sound groove, said picture record comprising a continuous strip film provided with individual frames, a gate provided with an aperture through which said strip film is moved, film-movement means at said gate for progressively moving said strip film, means for rotating the record and the film-movement means, means for actuating the film-movement means upon completion of its cycle run to position a complete frame in the aperture, and simultaneously rotating the record to a corresponding sound point directly under the stylus of the reproducer head.

7. In combination, a gate provided with an aperture, a continuous strip film for passage through said gate, means for moving said film through said gate, a spindle, and common means for rotating the spindle and the means for moving the film; said spindle provided with a crown tooth portion, the number of teeth thereof corresponding to the number of frames on said film moving past the aperture of the gate in a given period of time, and a disc record provided with a sound groove and provided with means for engagement with a diametric pair of the crown teeth on said spindle.

8. In combination, a gate provided with an aperture, a continuous strip film for passage through said gate, means for moving said film through said gate, a spindle, and common means for rotating the spindle and the means for moving the film; said spindle provided with a crown tooth portion, the number of teeth thereof corresponding to the number of frames on said film moving past the aperture of the gate in a given period of time, and a disc record provided with a sound groove and provided with means for engagement with a diametric pair of the crown teeth on said spindle, said record provided on the face opposite the sound groove with an annular series of spaced slots, the number of slots corresponding to the number of teeth on said spindle.

RALPH M. LIKE.

REFERENCES CITED

The following references are of record in the file of this patent:

UNITED STATES PATENTS

| Number | Name | Date |
|---|---|---|
| 761,846 | Messter | June 7, 1904 |
| 785,191 | Berliner | Mar. 21, 1905 |
| 1,442,331 | Fortunato | Jan. 16, 1923 |
| 1,760,219 | Thornton | May 27, 1930 |
| 1,828,199 | Owens | Oct. 20, 1931 |
| 1,904,490 | Mallina | Apr. 18, 1933 |
| 1,937,378 | Alexanderson | Nov. 28, 1933 |
| 1,939,031 | Aalborg et al. | Dec. 12, 1933 |
| 2,069,827 | Harrison | Feb. 7, 1937 |
| 2,214,468 | Lannerd | Sept. 10, 1940 |
| 2,376,741 | Weaver | May 22, 1945 |
| 2,378,416 | Like | June 19, 1945 |
| 2,387,916 | Knox et al. | Oct. 30, 1945 |
| 2,449,705 | Jones | Sept. 21, 1948 |

FOREIGN PATENTS

| Number | Country | Date |
|---|---|---|
| 488,634 | Great Britain | Oct. 5, 1936 |